(12) United States Patent
Sugawara

(10) Patent No.: US 10,305,076 B2
(45) Date of Patent: May 28, 2019

(54) ON-VEHICLE BATTERY PACK

(71) Applicant: Hitachi Automotive Systems, Ltd, Hitachinaka-shi, Ibaraki (JP)

(72) Inventor: Tatsuo Sugawara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 148 days.

(21) Appl. No.: 15/501,446

(22) PCT Filed: Aug. 22, 2014

(86) PCT No.: PCT/JP2014/072036
§ 371 (c)(1),
(2) Date: Feb. 3, 2017

(87) PCT Pub. No.: WO2016/027377
PCT Pub. Date: Feb. 25, 2016

(65) Prior Publication Data
US 2017/0237053 A1     Aug. 17, 2017

(51) Int. Cl.
*H01M 2/10* (2006.01)
*H01M 2/12* (2006.01)
*B60L 11/18* (2006.01)

(52) U.S. Cl.
CPC ....... *H01M 2/1083* (2013.01); *B60L 11/1877* (2013.01); *B60L 11/1879* (2013.01); *H01M 2/10* (2013.01); *H01M 2/1077* (2013.01); *H01M 2/1294* (2013.01); *H01M 2220/20* (2013.01); *Y02T 10/7005* (2013.01)

(58) Field of Classification Search
CPC .... H01M 2/1083; H01M 2/10; H01M 2/1077; B60L 11/1879
See application file for complete search history.

(56) References Cited

U.S. PATENT DOCUMENTS

| 2012/0164504 A1 | 6/2012 | Takashina et al. |
| 2013/0192914 A1 | 8/2013 | Nakamori |
| 2013/0273398 A1 | 10/2013 | Hoshi et al. |

(Continued)

FOREIGN PATENT DOCUMENTS

| JP | 2002-127761 A | 5/2002 |
| JP | 2006-80042 A | 3/2006 |
| JP | 2009-87738 A | 4/2009 |

(Continued)

OTHER PUBLICATIONS

Japanese-language Office Action issued in counterpart Japanese Application No. 2016-543785 dated Aug. 29, 2017 with English translation (Five (5) pages).

(Continued)

*Primary Examiner* — Jonathan G Jelsma
(74) *Attorney, Agent, or Firm* — Crowell & Moring LLP

(57) ABSTRACT

A battery pack includes a case which includes at least one battery module having a plurality of battery cells, a bottom plate where the battery module is placed, side plates and erected around the bottom plate, and a top plate provided in the upper ends of the side plates and to face the bottom plate, and a bracket provided in the side plates and to fix the case to a vehicle loading portion, and a partitioning member which is provided in the case and transfers a force added to the top plate to the bracket.

5 Claims, 21 Drawing Sheets

(56) References Cited

U.S. PATENT DOCUMENTS

2014/0014428 A1* 1/2014 Yanagi .................... B60K 1/04
                                                    180/68.5
2014/0030563 A1    1/2014 Hoshi et al.

FOREIGN PATENT DOCUMENTS

| JP | 2010-250984 A | 11/2010 |
| JP | 2012-138307 A | 7/2012 |
| JP | 2013-157242 A | 8/2013 |
| JP | 2013-235827 A | 11/2013 |
| JP | 2014-22157 A | 2/2014 |
| WO | WO 2012/140791 A1 | 10/2012 |

OTHER PUBLICATIONS

International Search Report (PCT/ISA/210) issued in PCT Application No. PCT/JP2014/072036 dated Sep. 22, 2014 with English translation (5 pages).
Japanese-language Written Opinion (PCT/ISA/237) issued in PCT Application No. PCT/JP2014/072036 dated Sep. 22, 2014 (4 pages).

* cited by examiner

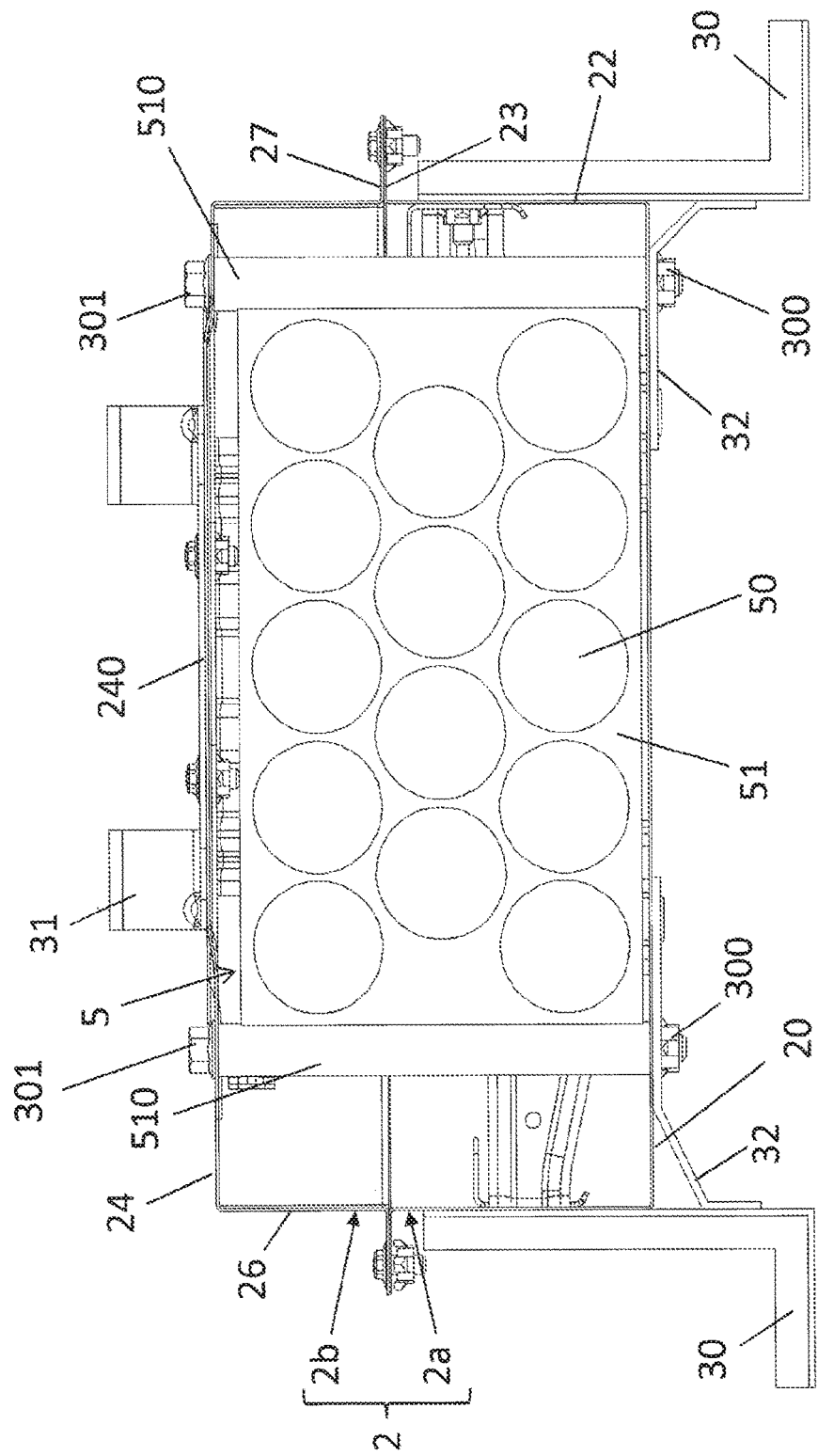

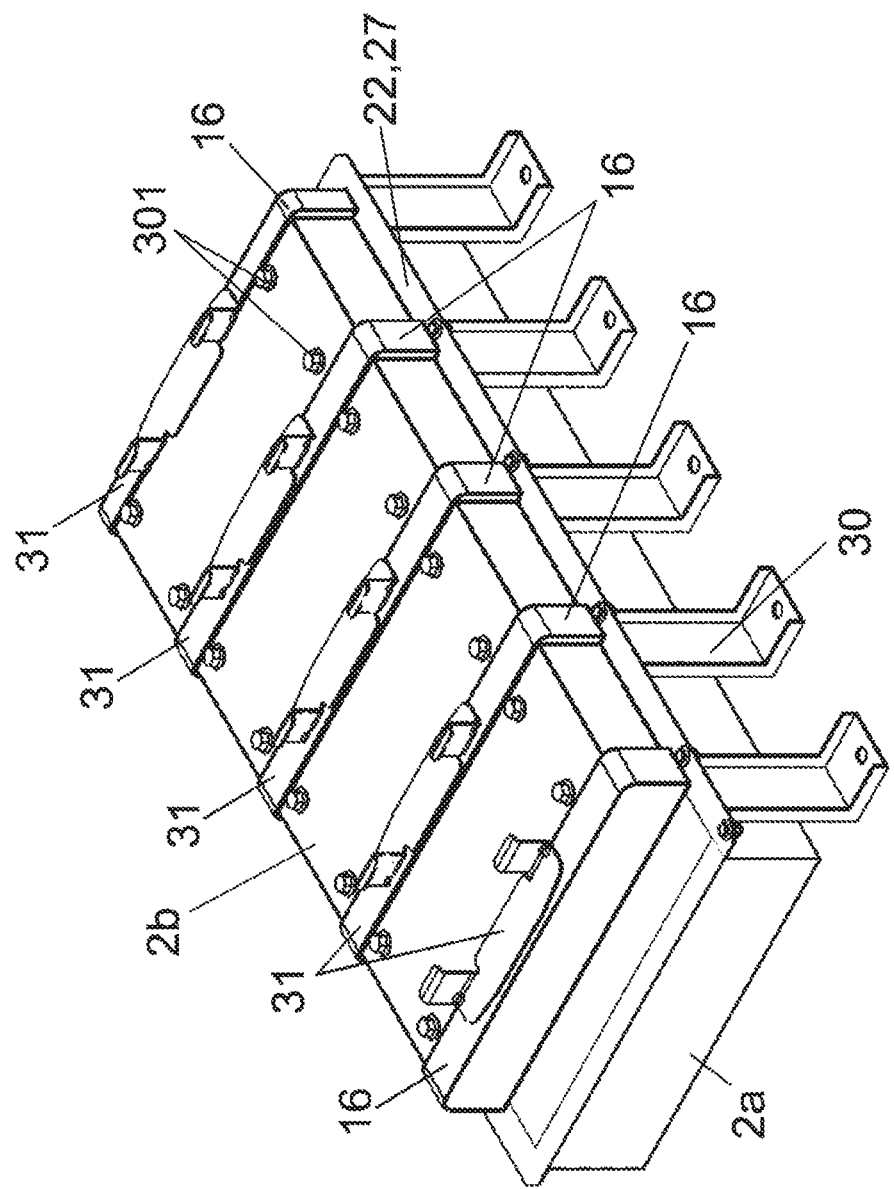

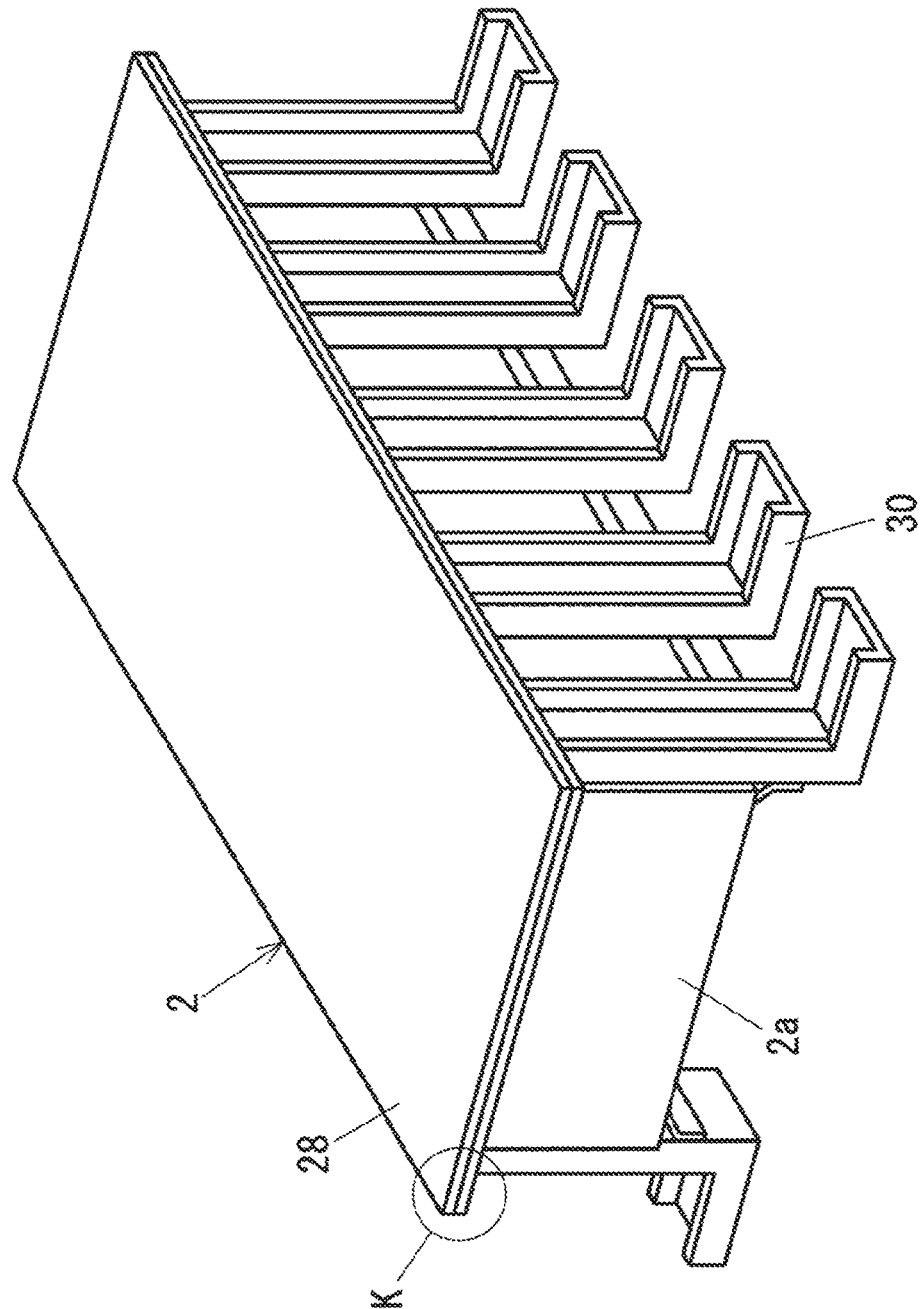

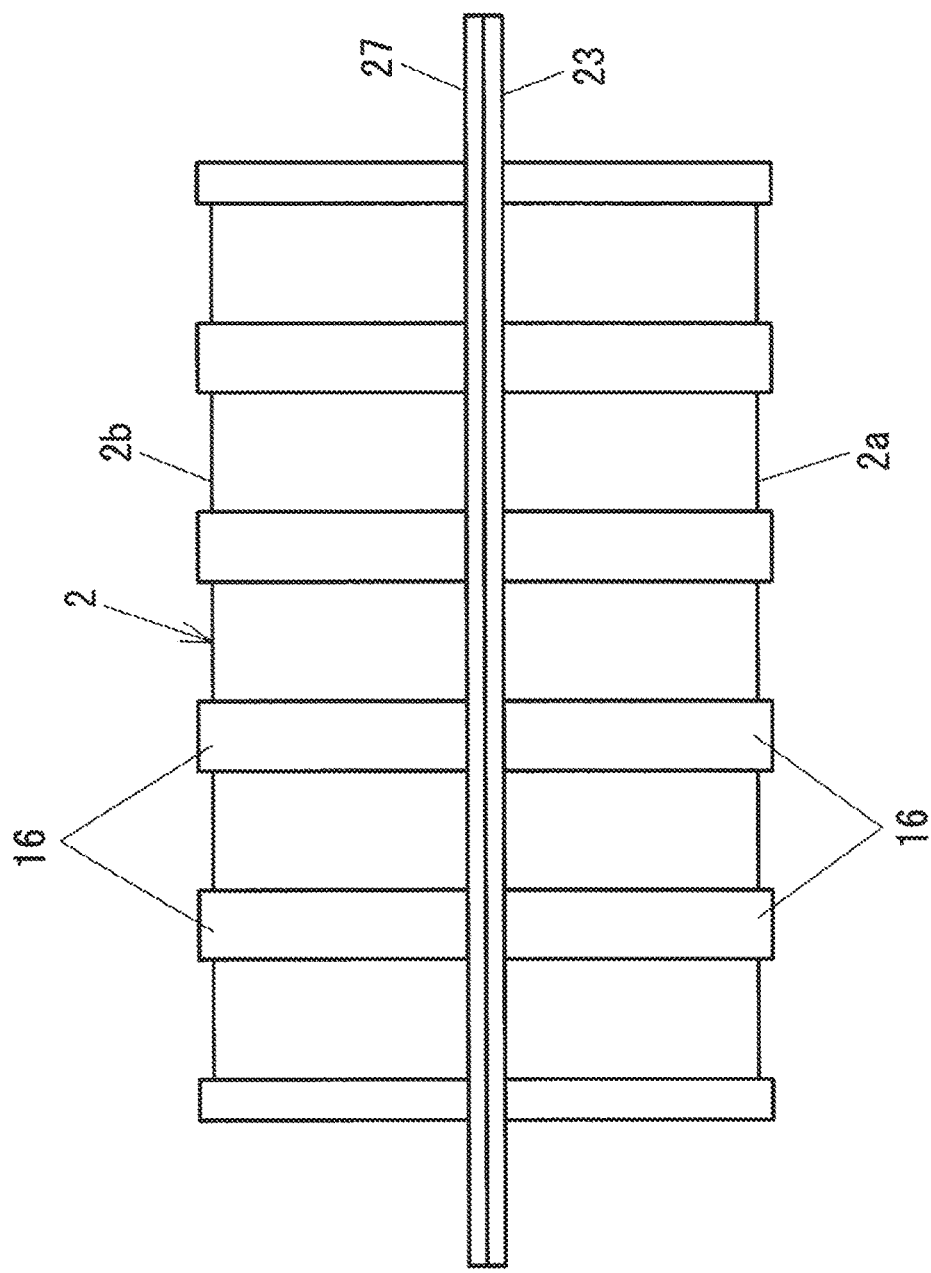

ON-VEHICLE BATTERY PACK

TECHNICAL FIELD

The present invention relates to an on-vehicle battery pack.

BACKGROUND ART

In recent years, hybrid automobiles and electric automobiles draw attention as the consciousness of power saving and environmental problems is increased. A battery pack is mounted in the hybrid automobile and the electric automobile, and power is acquired from the battery pack to drive the automobile.

The battery pack includes a battery module which is configured by a plurality of battery cells, and a battery case which stores the battery module. PTL 1 discloses a battery pack which includes the battery module configured by the plurality of battery cells and the battery case to store the battery module.

The battery case to store the battery module includes a first supporting body which supports a plurality of battery modules adjacent in a vehicle width direction, and a second supporting body which supports the plurality of battery modules disposed in the vehicle width direction and a vehicle longitudinal direction. The first supporting body includes a first lower holder and a first upper holder which secure respectively the lower portion and the upper portion of all the battery modules. The first lower holder placed in the battery case in a state where all the battery modules are secured. All the battery modules are supported to the battery case by fixing both peripheral portions in the vehicle width direction of the first upper holder to a battery tray. The second supporting body also supports all the battery modules to the battery case similarly to the first supporting body.

CITATION LIST

Patent Literature

PTL 1: JP 2014-022157 A

SUMMARY OF INVENTION

Technical Problem

The battery pack disclosed in PTL 1 is structured to prevent the upper surfaces of the battery modules adjacent in the vehicle width direction from being bent in a direction away from each other by disposing a support holder on the battery modules in a state where the battery modules are supported by the first supporting body. However, it is not sufficiently taken into consideration that the lower surfaces of the battery modules are bent in a direction away from each other. The first lower holder of the lower surface may come into contact with the bottom surface in the battery case, and thus a problem such as damage and noises may be caused. In addition, the battery module and the battery cell may be damaged due to an impact. In this way, there is a problem in that the battery pack is not sufficient in strength.

Solution to Problem

According to a first aspect of the invention, an on-vehicle battery pack includes: at least one battery module that includes a plurality of battery cells; a case that includes a bottom plate where the battery module is placed, a side plate erected around the bottom plate, and a top plate provided to face the bottom plate at an upper end of the erected side plate; a bracket that is provided in the side plate and fixes the case to a vehicle loading portion; and a reinforcing part that is provided in the case and transfers a force added to the top plate to the bracket.

According to a second aspect of the invention, in the on-vehicle battery pack according to the first aspect, a plurality of the battery modules are disposed along a longitudinal direction of the case, and the reinforcing part is a partitioning member that is alternately disposed with respect to the battery module along the longitudinal direction, and includes a first connection portion to be connected to the top plate, and a second connection portion to be connected to the bracket through the side plate.

According to a third aspect of the invention, in the on-vehicle battery pack according to the second aspect, the side plate includes a first side plate and a second side plate which are separated, the case includes a lower case that includes the bottom plate, the first side plate erected around the bottom plate, and a first flange formed at an upper end of the erected first side plate, and an upper case that includes the top plate, the second side plate erected around the top plate, and a second flange that is formed at an upper end of the erected second side plate to be fastened to the first flange, and the second connection portion is disposed in the vicinity of the first flange of the first side plate.

According to a fourth aspect, in the on-vehicle battery pack according to the third aspect, the bracket is an L-shaped bracket that includes a first fixing portion to be fixed to the first side plate and a second fixing portion to be fixed to the vehicle loading portion, and the on-vehicle battery pack further includes: a supporting member that is bridged in an arched shape between the bracket and the bottom plate and connected to the bracket and the bottom plate. The battery module is connected to the supporting member through the bottom plate in a connection portion between the supporting member and the bottom plate, and the partitioning member includes a third connection portion that is connected to the supporting member through the bottom plate in the connection portion between the supporting member and the bottom plate.

According to a fifth aspect of the invention, in the on-vehicle battery pack according to any one of the second to fourth aspects, the top plate includes a plurality of deformation portions that are deformed to bulge outside the case or inside the case, and the first connection portion of the partitioning member is connected to the deformation portion.

According to a sixth aspect of the invention, in the on-vehicle battery pack according to the fifth aspect, a member protruding upward from the top plate is provided in an outer peripheral surface of the deformation portion.

According to a seventh aspect of the invention, in the on-vehicle battery pack according to the second aspect, a plurality of wiring fixing portions are separately provided to fix a wiring leading out of the battery module to each partitioning member.

According to an eighth aspect of the invention, in the on-vehicle battery pack according to the second aspect, each partitioning member includes a sealing portion to inhibit a gas discharged from a safety valve of the battery cell of the battery module from flowing into the adjacent battery modules.

Advantageous Effects of Invention

According to the invention, it is possible to improve strength of an on-vehicle battery pack.

BRIEF DESCRIPTION OF DRAWINGS

FIG. 3 is a diagram FIGS. 3A and 3B are diagrams illustrating a lower case 2a.

FIG. is a cross-sectional view illustrating a fixing structure of a battery module 5 with respect to a case 2.

Figure 5:
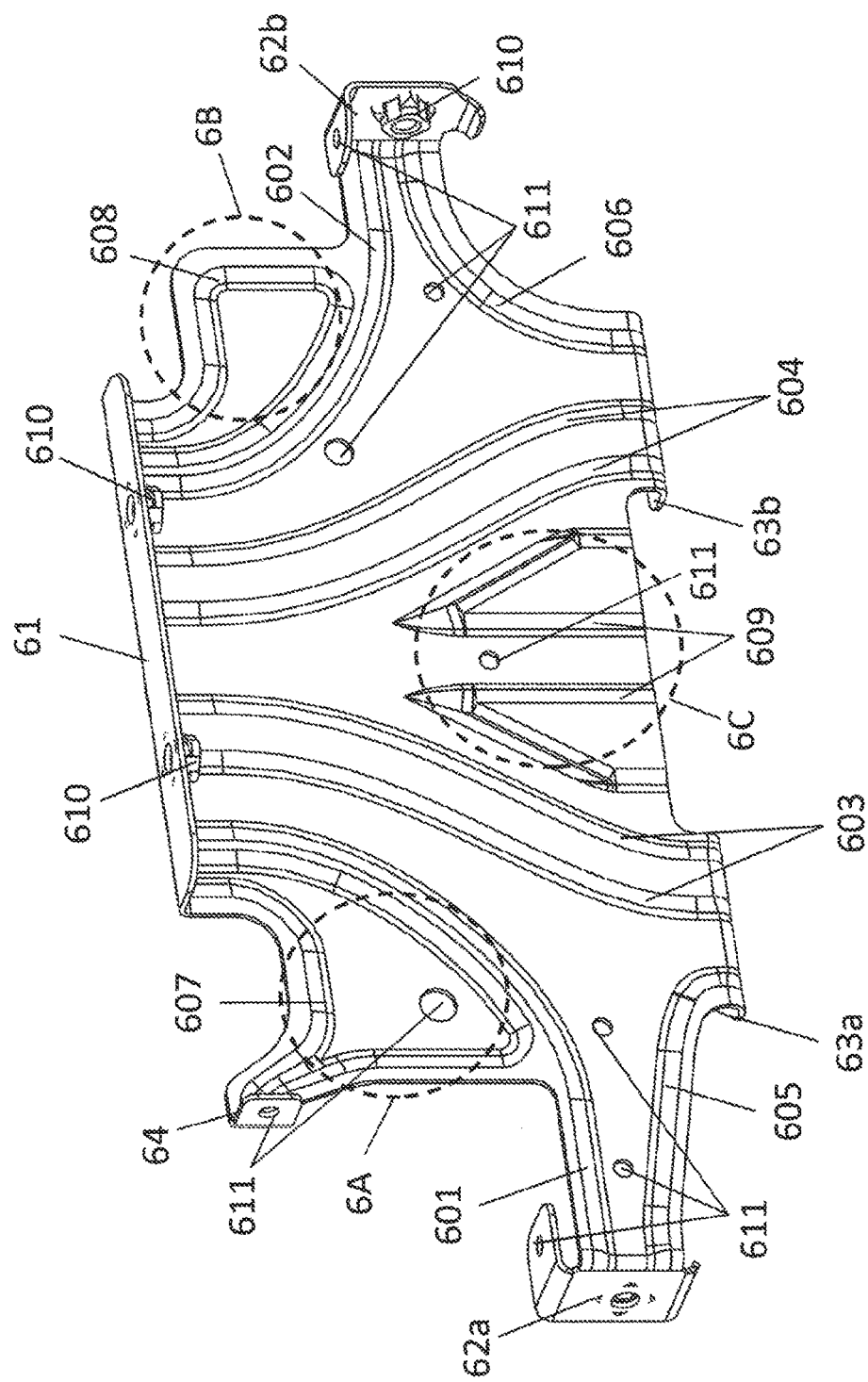

FIG. 5 is a perspective view of a partitioning member 6.

Figure 6:
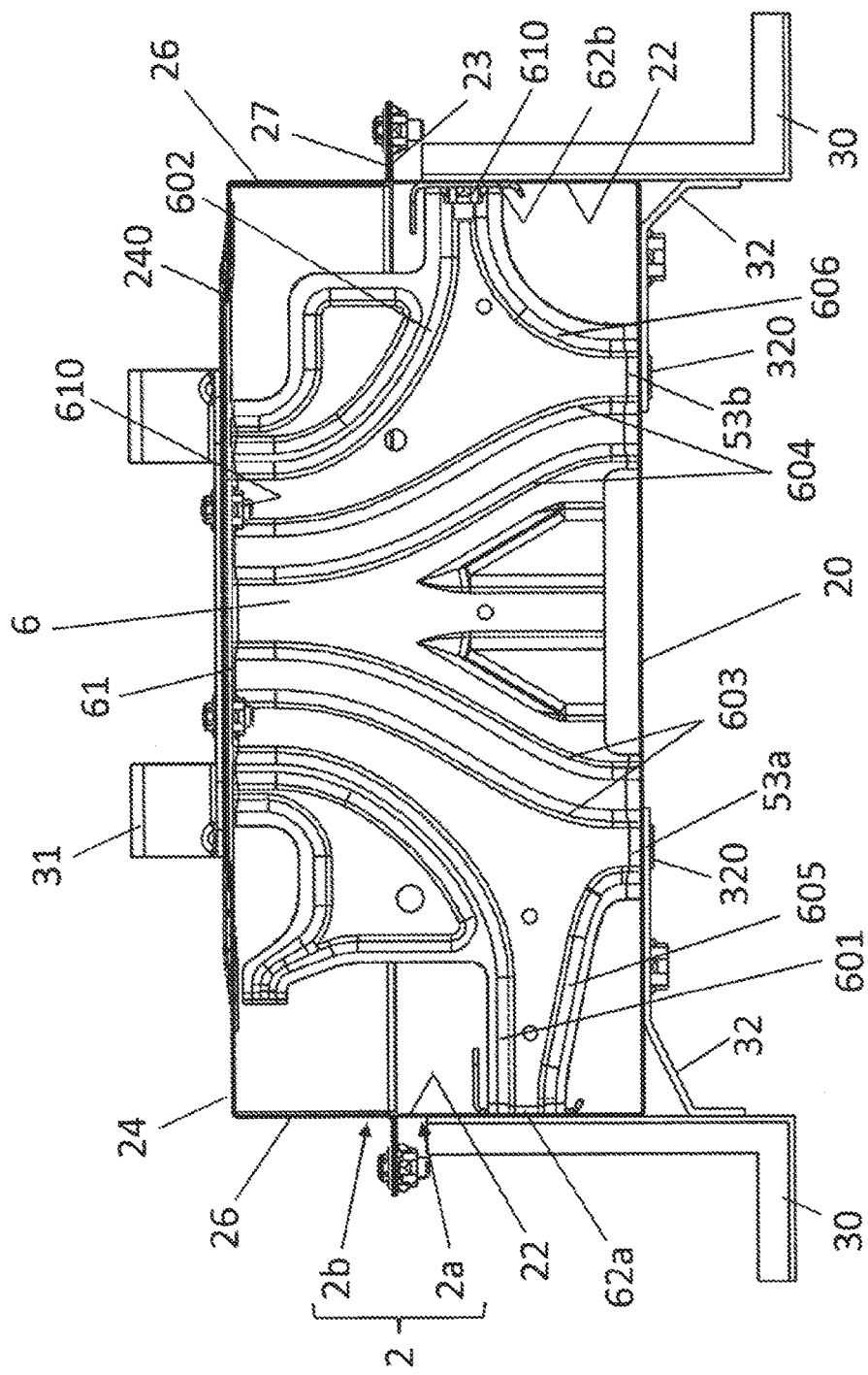

FIG. 6 is a cross-sectional view illustrating a connection structure of the partitioning member 6 with respect to the case 2.

Figure 7:
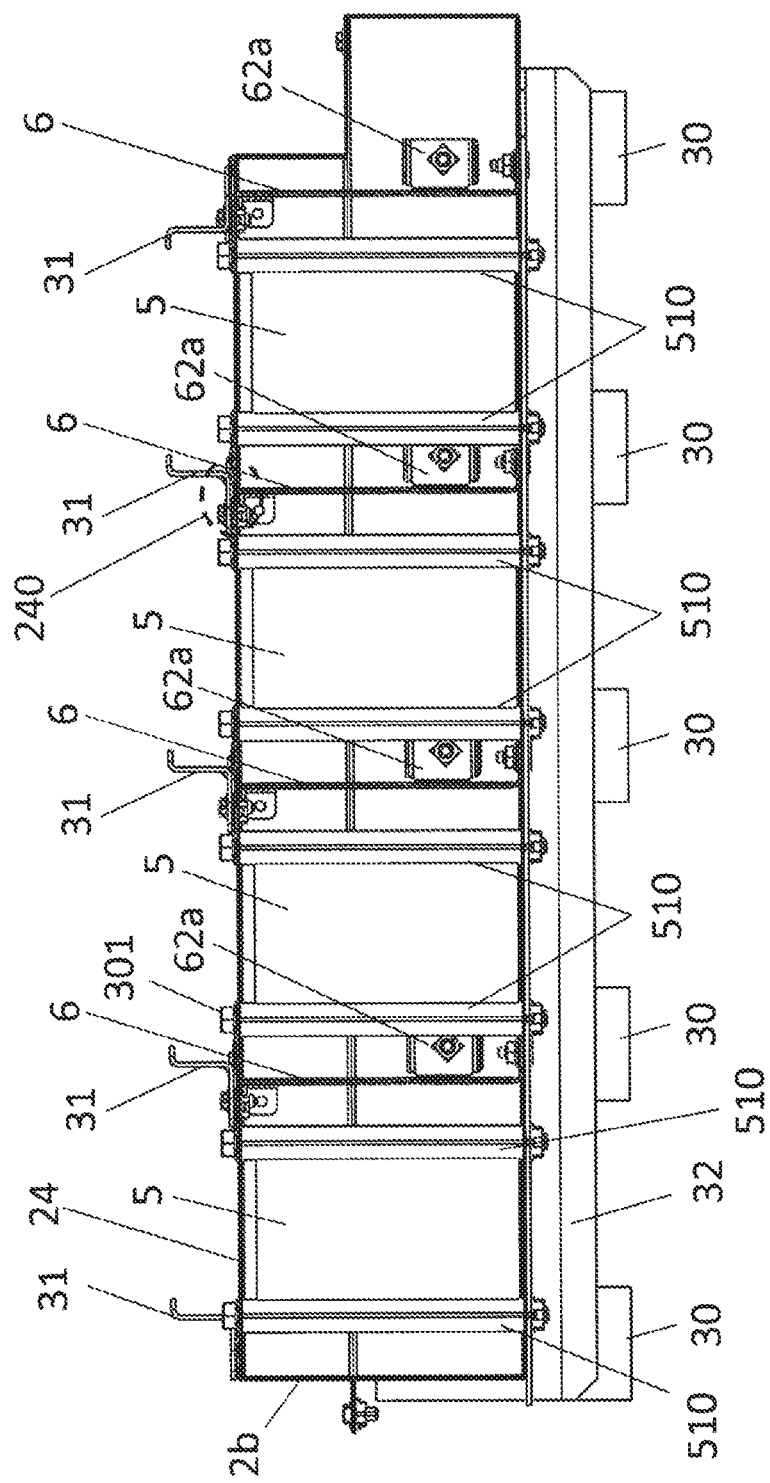

FIG. 7 is a cross-sectional view taken along a longitudinal direction of the case 2.

Figure 8:
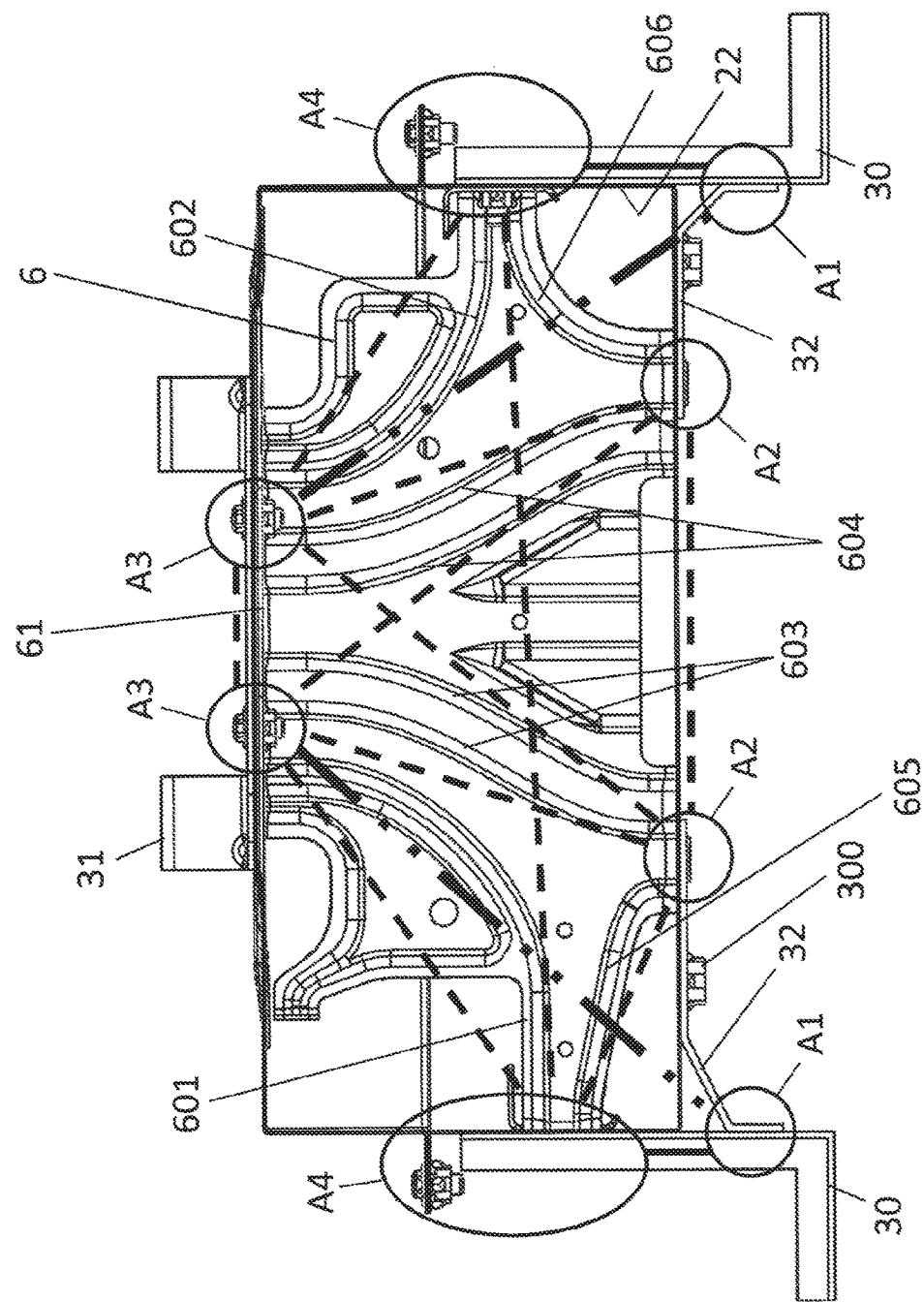

FIG. 8 is a diagram for describing a function of the partitioning member 6 as a reinforcing part.

Figure 9:
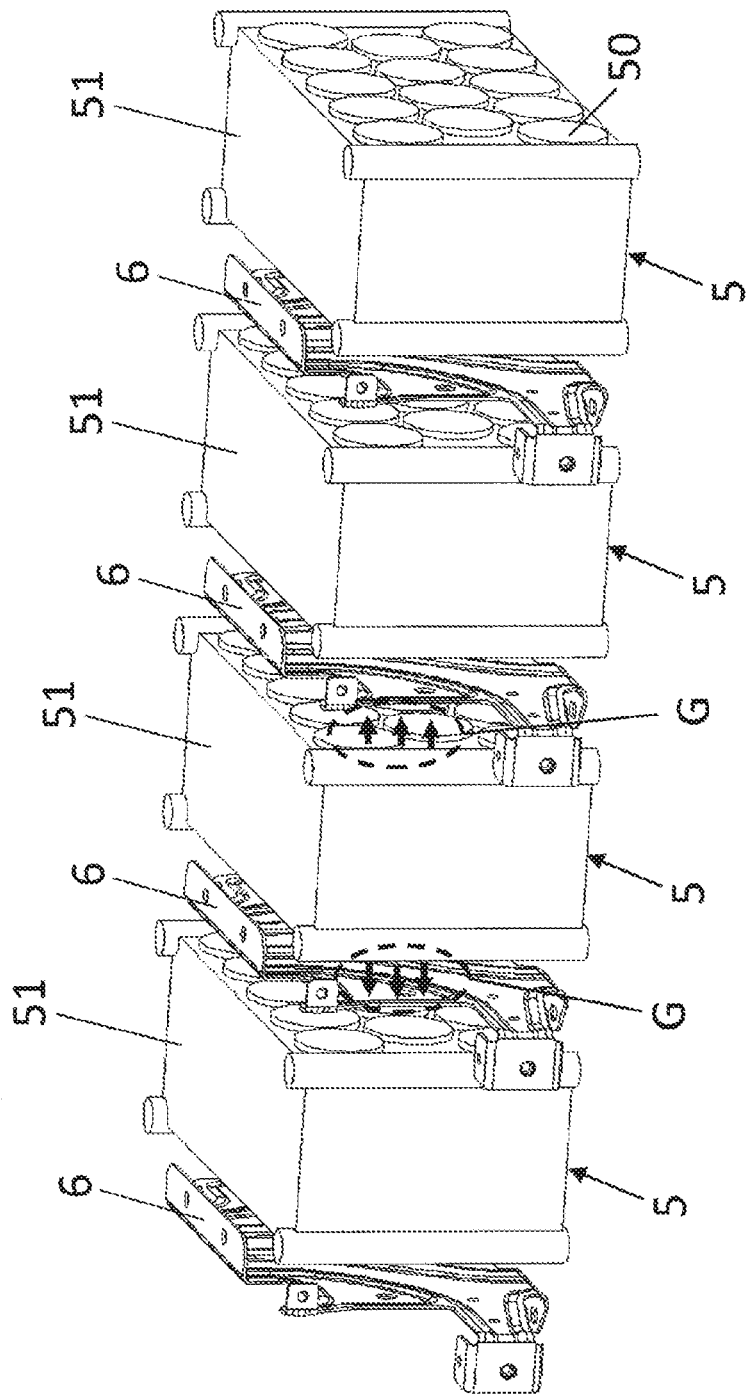

FIG. 9 is a diagram for describing a gas blocking effect of the partitioning member 6.

Figure 10:
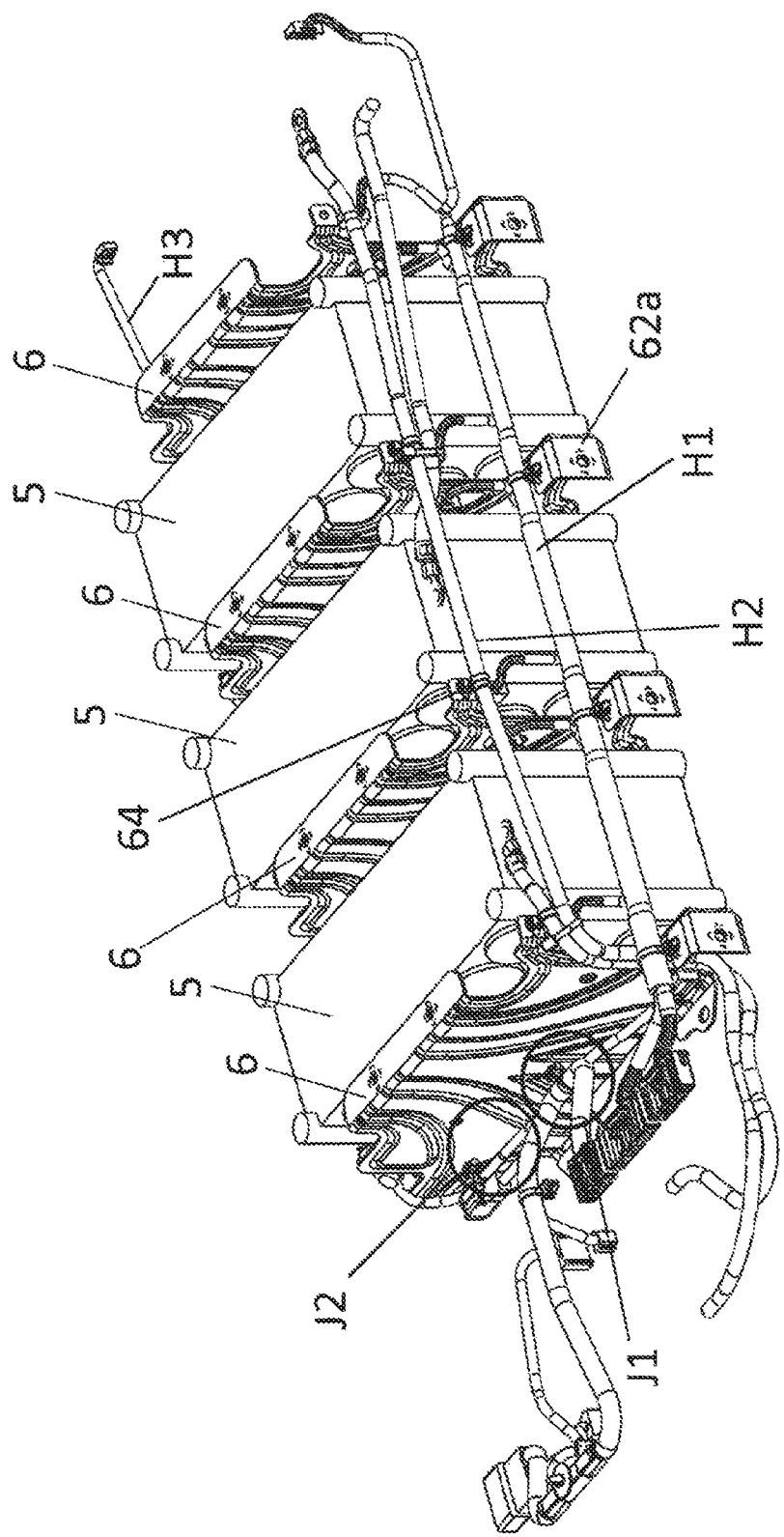

FIG. 10 is a diagram illustrating an example of harnesses (power lines and sensing lines) which are wounded in the case 2.

Figure 11:
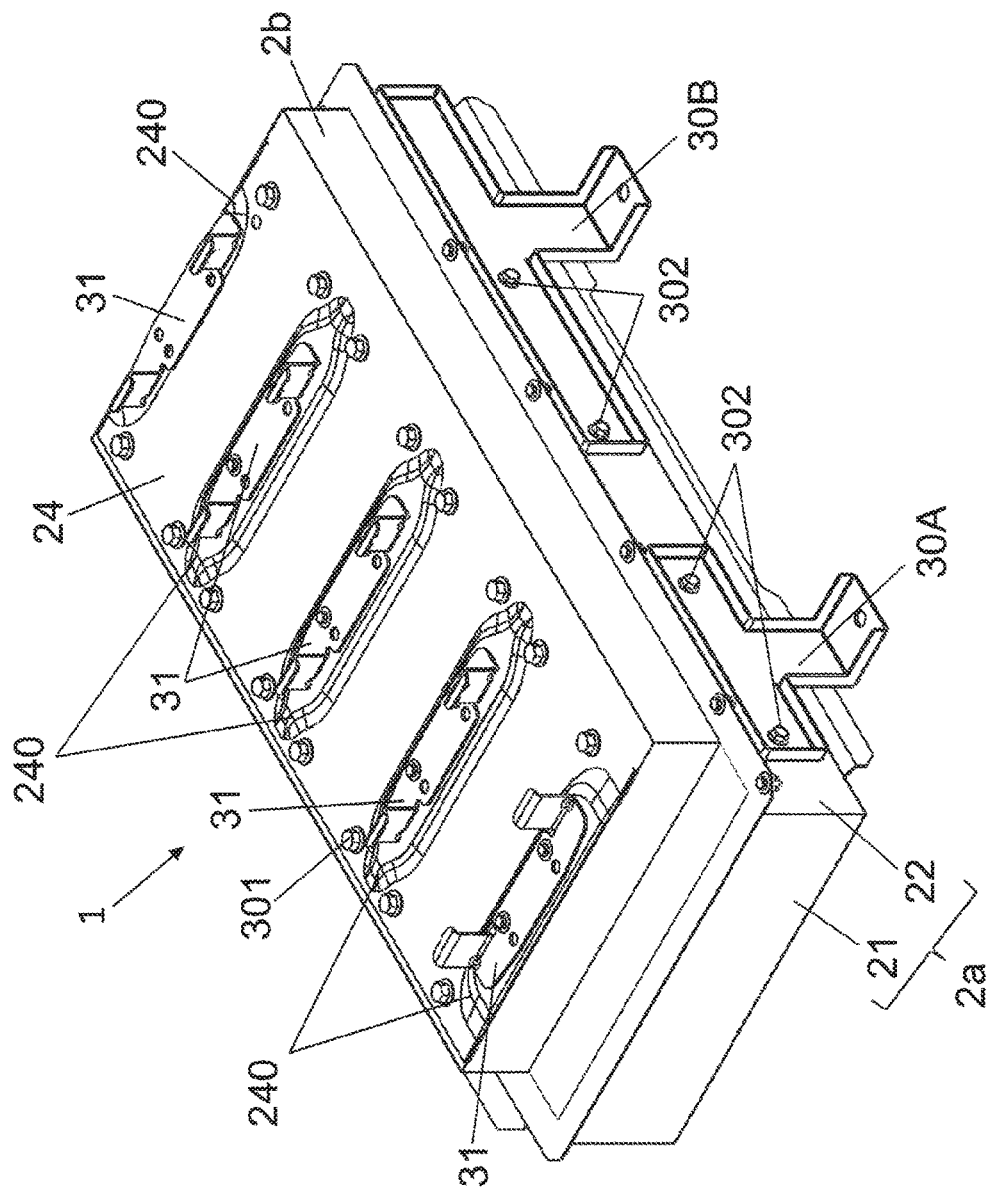

FIG. 11 is a diagram illustrating a first modification of the battery pack 1.

Figure 12:
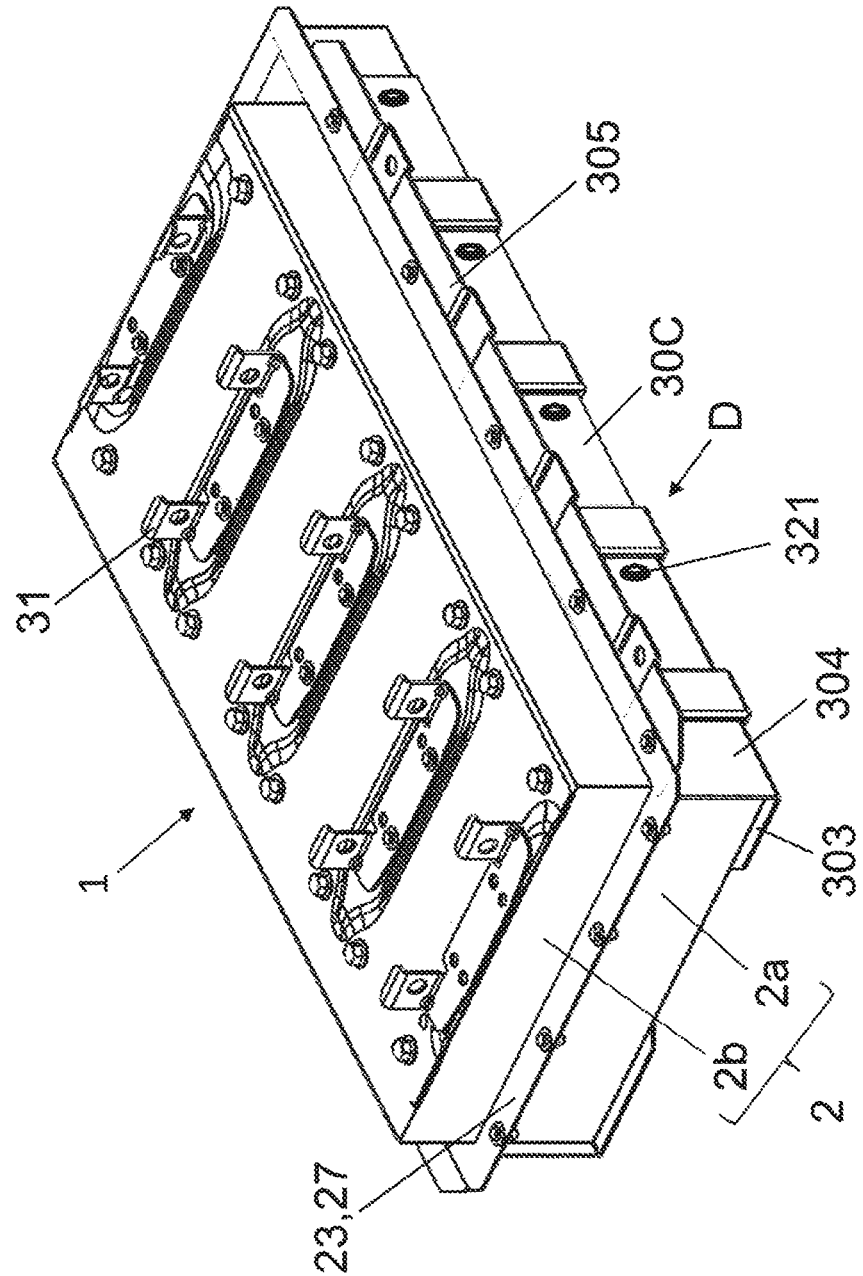

FIG. 12 is a diagram illustrating a second modification of the battery pack 1.

Figure 13:
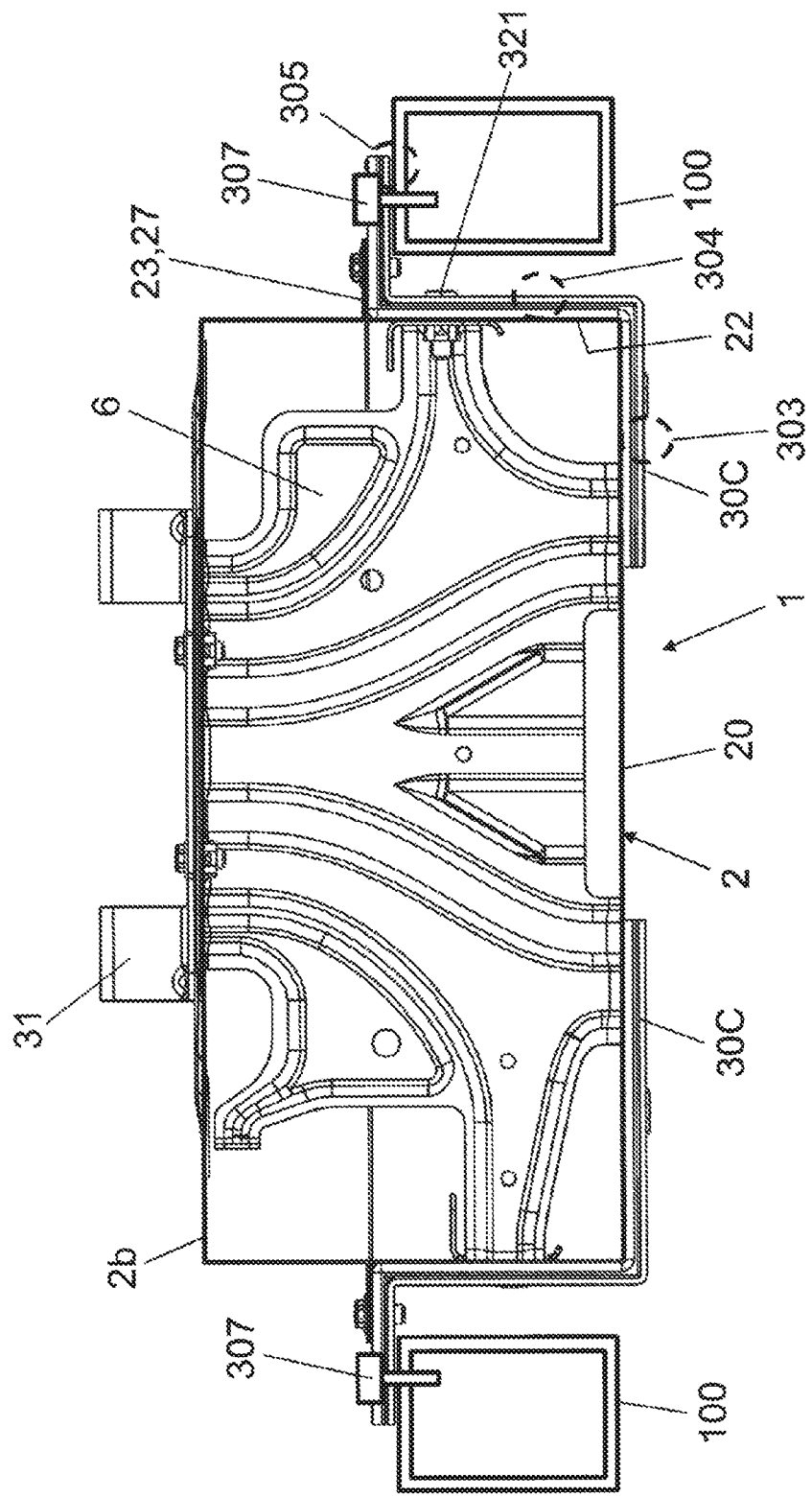

FIG. 13 is a cross-sectional view of the battery pack 1 of FIG. 12 when viewed in a direction perpendicular to the longitudinal direction of the case.

Figure 14A:
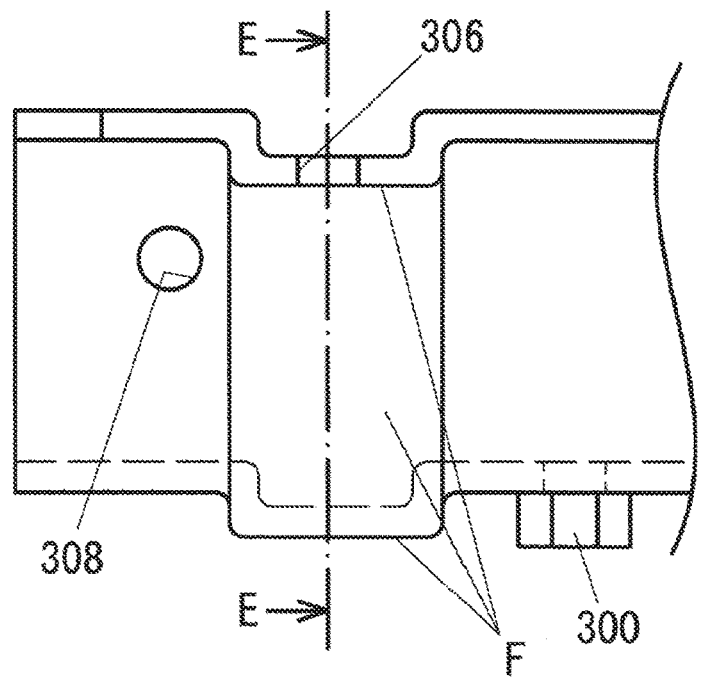
Figure 14B:
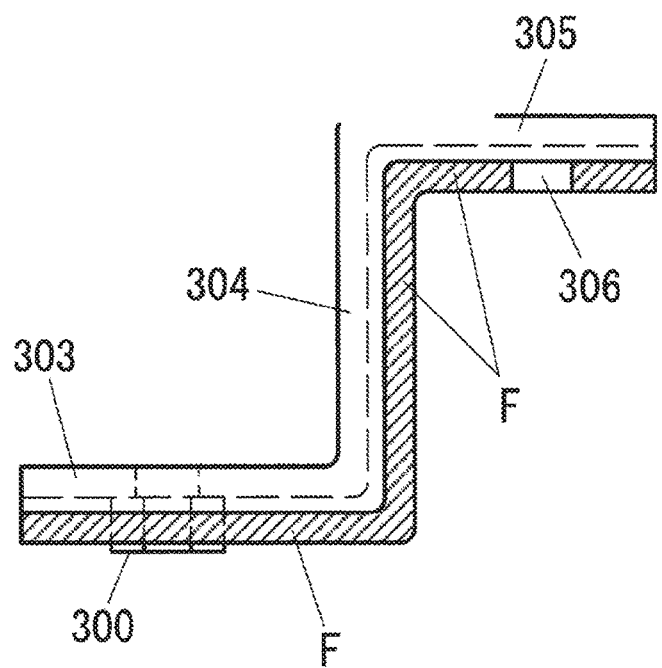

FIGS. 14A and 14B are diagrams illustrating the shape of a bracket 30C in detail.

FIG. 15 is a perspective view illustrating a second embodiment of the on-vehicle battery pack according to the invention.

Figure 16:
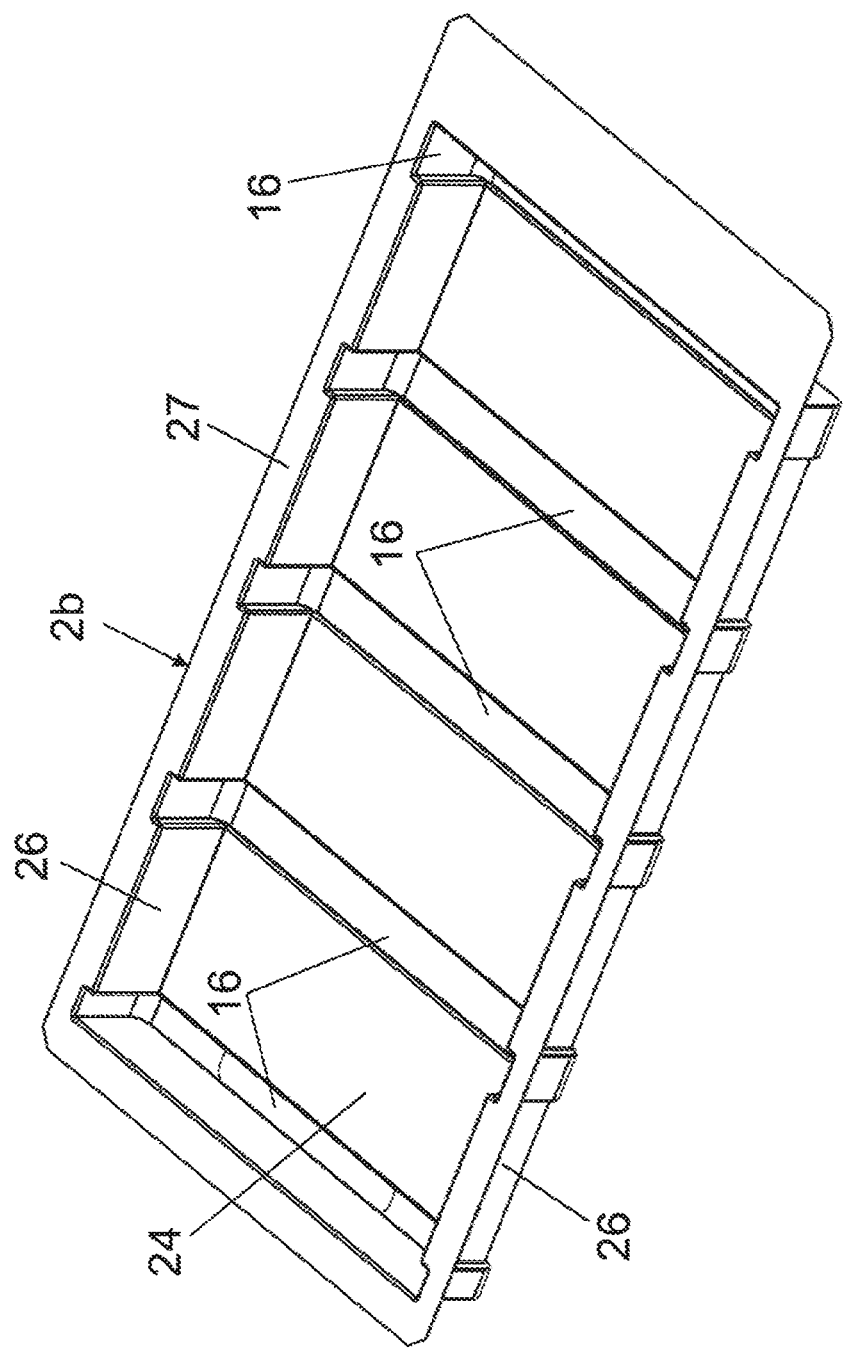

FIG. 16 is a perspective view illustrating an inner circumferential surface of an upper case 2b.

Figure 17:
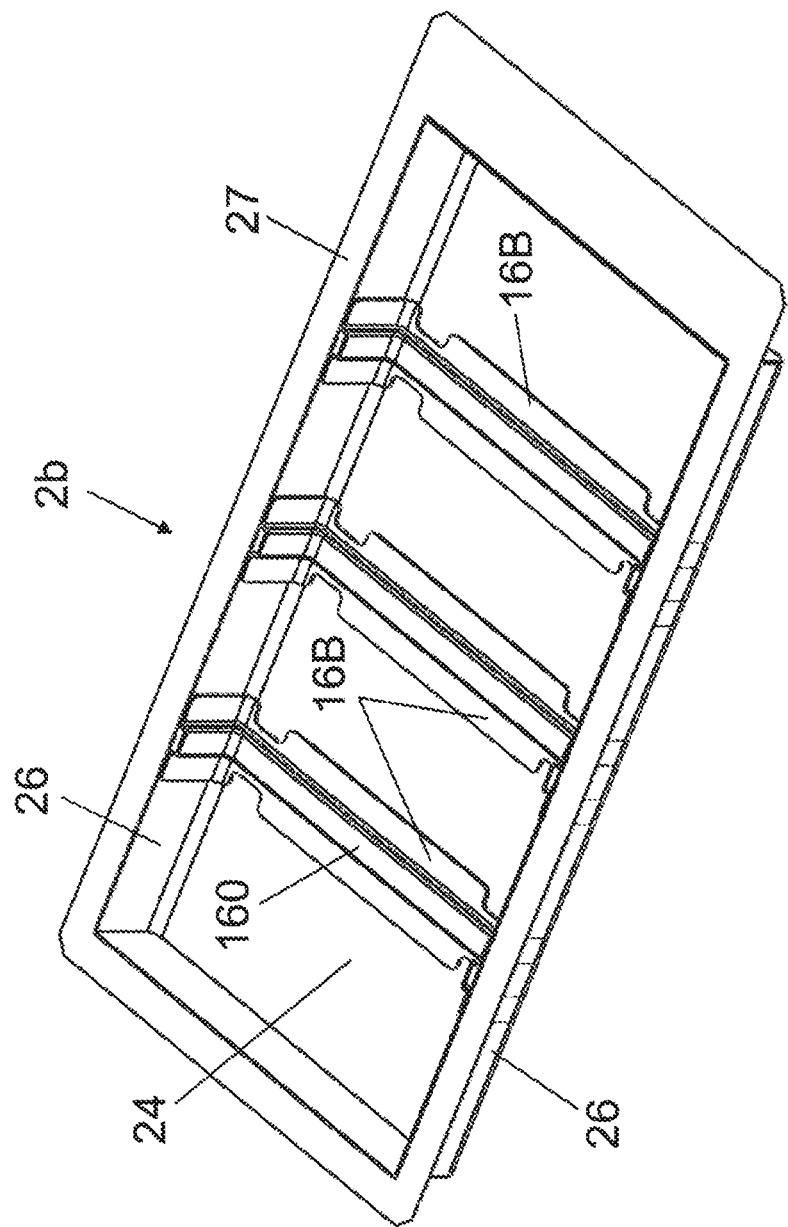

FIG. 17 is a diagram illustrating a first modification of the second embodiment.

Figure 18:
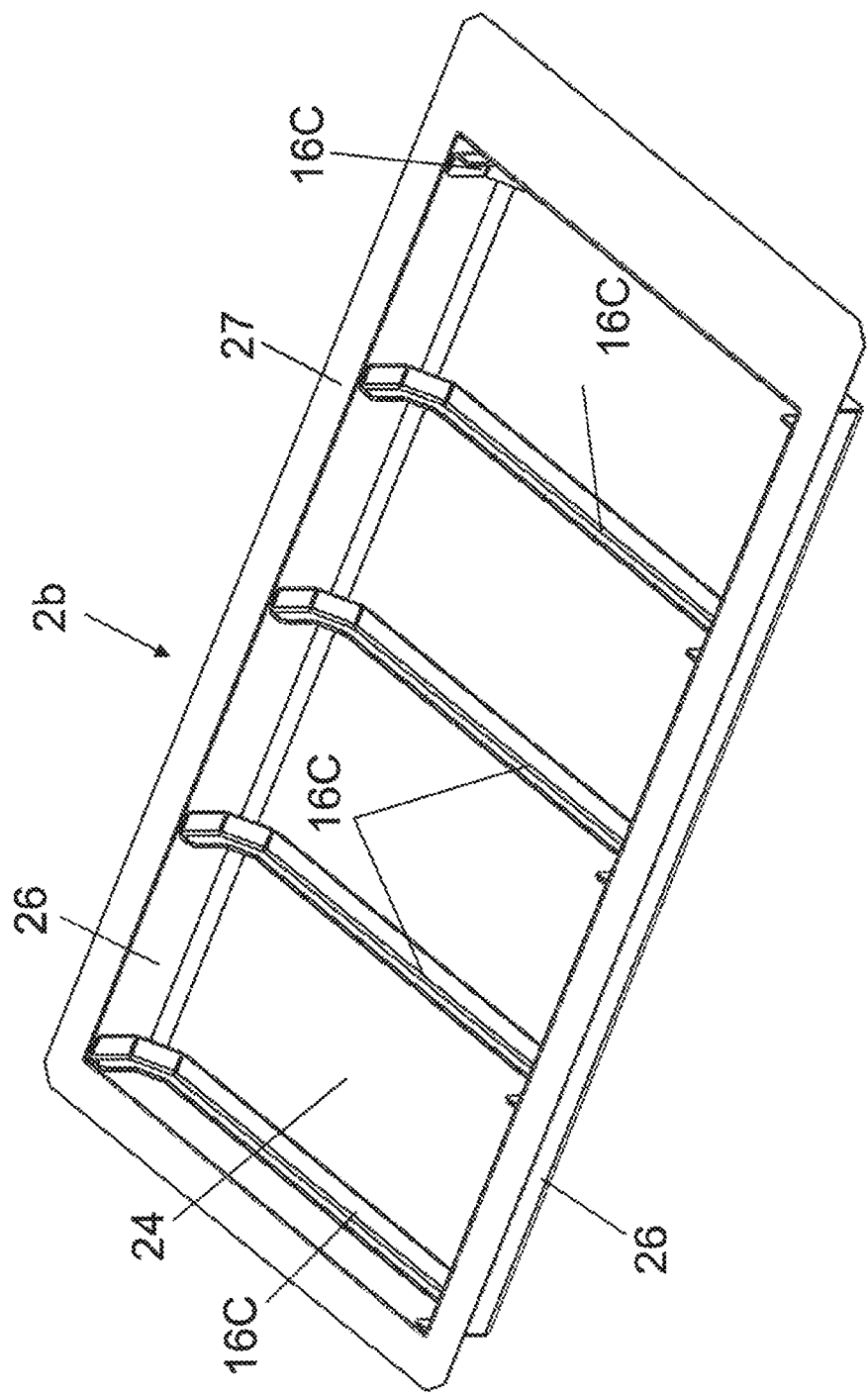

FIG. 18 is a diagram illustrating a second modification of the second embodiment.

FIG. 19 is a perspective view illustrating the case 2 which is configured by the box-shaped lower case 2a and a tabular lid 28.

FIG. 20 is a diagram illustrating the upper case 2b and the lower case 2a where the reinforcing parts 16 are formed.

DESCRIPTION OF EMBODIMENTS

Hereinafter, embodiments of the invention will be described with reference to the drawings.

First Embodiment

Figure 1:
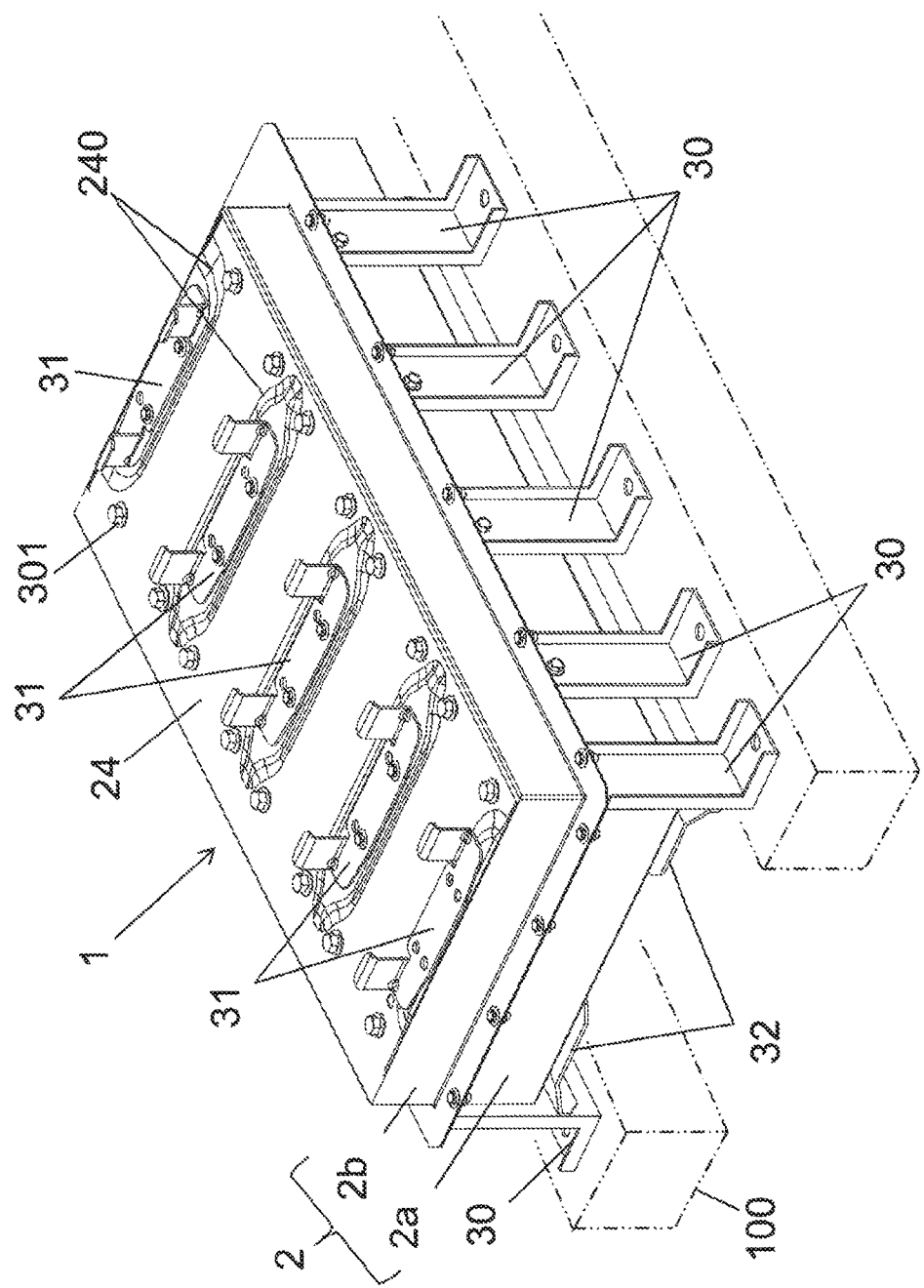
FIG. 1 is a perspective view illustrating a first embodiment of an on-vehicle battery pack according to the invention.

FIG. 1 is a perspective view illustrating a first embodiment of an on-vehicle battery pack according to the invention. The on-vehicle battery pack (hereinafter, referred to as battery pack) of this embodiment is mounted in an electric motor vehicle such as a hybrid automobile and an electric automobile.

A battery pack 1 includes a case 2 in a substantially cuboid shape in which a plurality of battery modules (see FIG. 2 below) are stored, and a bracket 30 which is used to fasten the case 2 to a battery pack fastening part 100 provided in the vehicle. The weight of the battery pack 1 is transmitted to the battery pack fastening part 100 through the plurality of brackets 30. The case 2 includes a lower case 2a where the plurality of brackets 30 are provided, and an upper case 2b which is fixed to the upper portion. A plurality of supporting members (for example, L-shaped brackets) 31 are provided in the upper surface of the upper case 2b to receive the weight in a case where a load is applied from a vehicle assembly onto the upper surface of the battery pack 1. Further, the supporting member 31 may not be provided in a situation where the weight is not applied from the vehicle onto the upper surface of the case 2.

Figure 2:
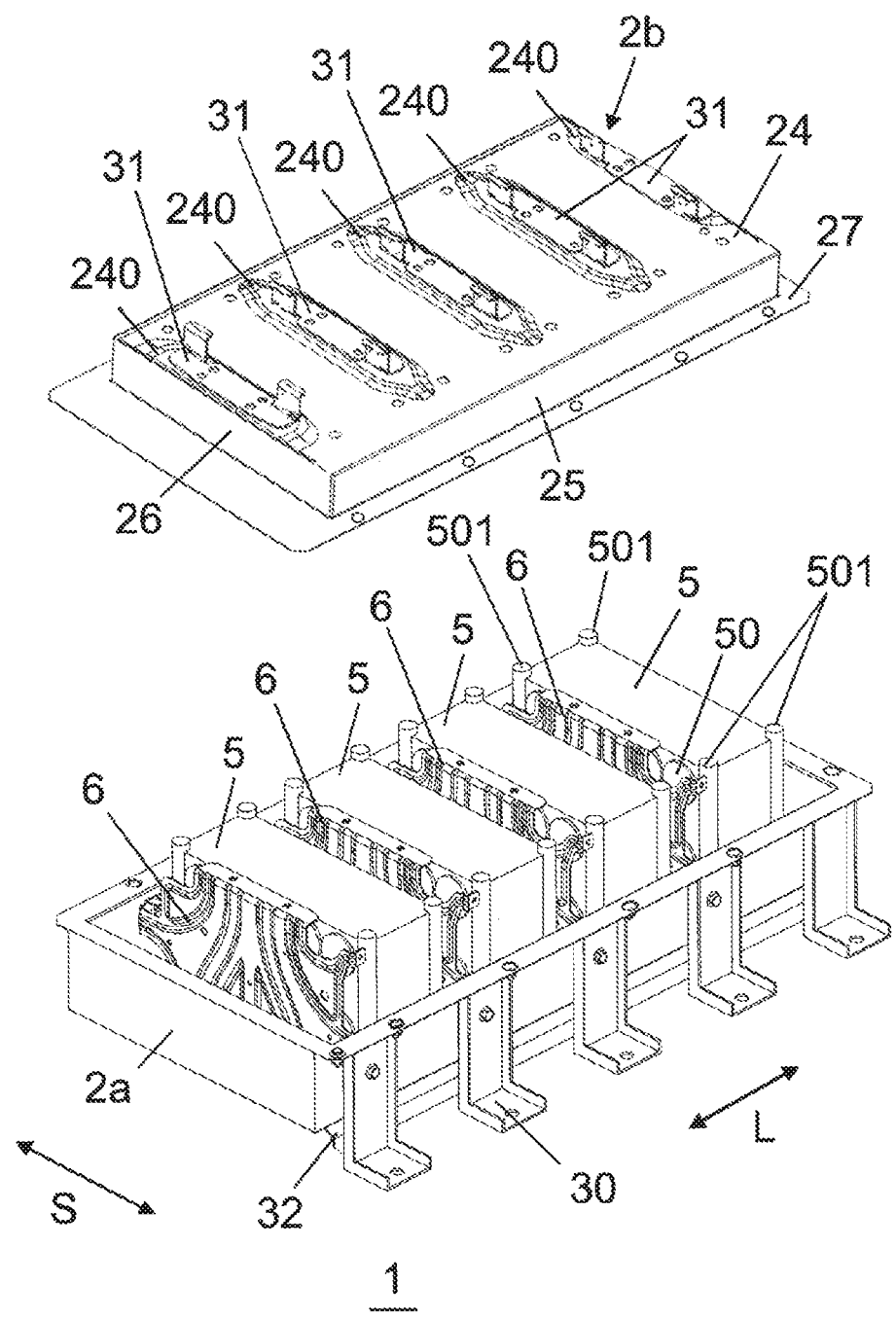
FIG. 2 is a perspective view illustrating a state where an upper case of a battery pack 1 is detached.

FIG. 2 is a perspective view illustrating a state where the upper case of the battery pack 1 is detached. In the lower case 2a, a plurality of battery modules 5 are disposed in a longitudinal direction L of the case. In the example illustrated in FIG. 2, four battery modules 5 are provided. The battery module 5 includes a plurality of battery cells 50. A safety valve is provided in a battery can of each battery cell 50 to discharge gas generated when an inner pressure of the battery rises to a predetermined pressure due to overcharge. In addition, a plurality of partitioning members 6 are provided in the case 2 to improve a mechanical strength of the case 2. The partitioning member 6 and the battery module 5 are alternately disposed in the longitudinal direction of the case.

Figure 3A:
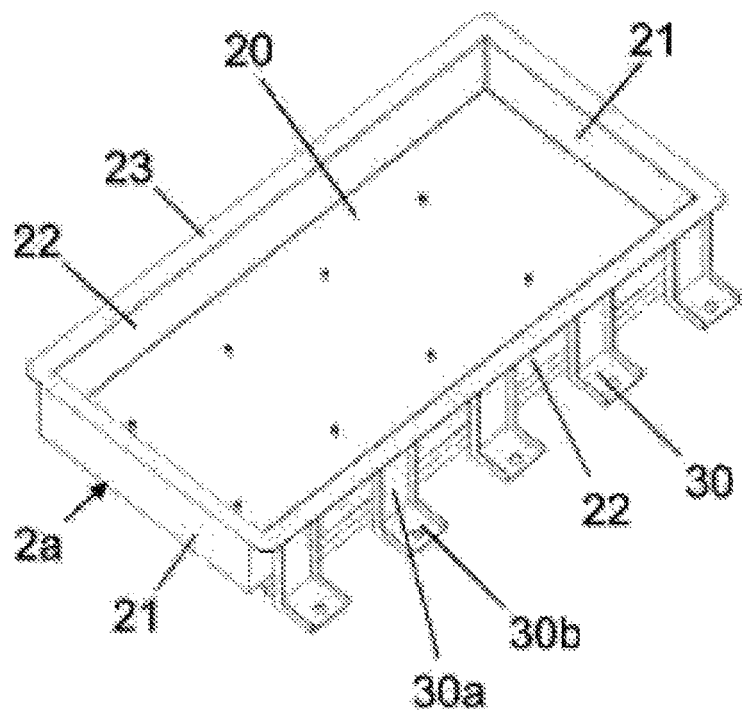
Figure 3B:
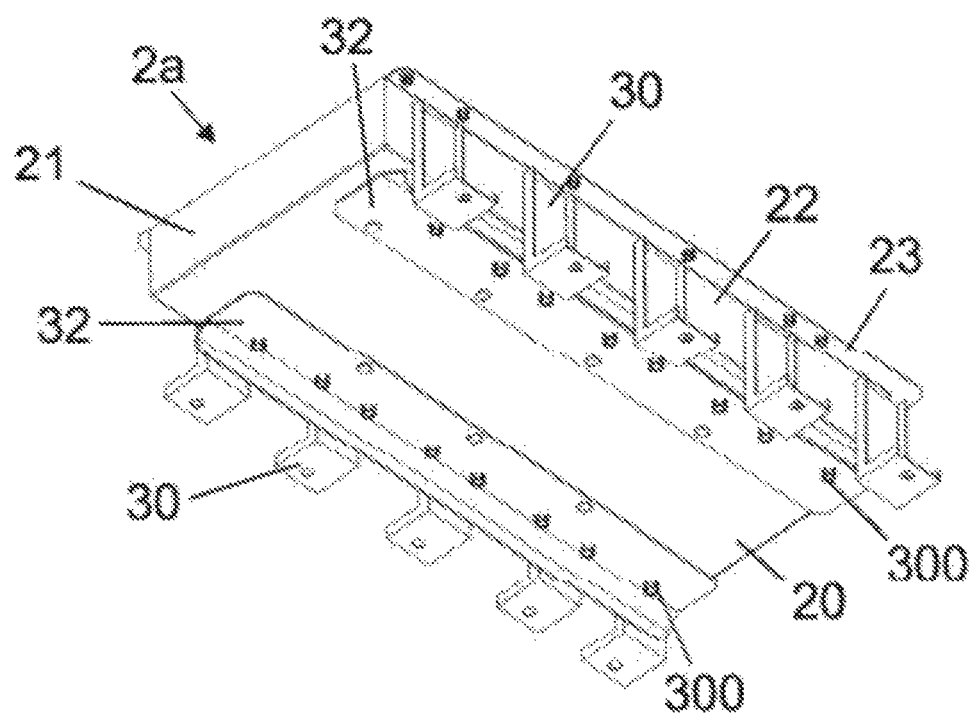

FIG. 3 is a diagram illustrating the lower case 2a. FIG. 3($a$) is a perspective view of the lower case 2a when obliquely viewed from the upper side, and FIG. 3($b$) is a perspective view of the lower case 2a when obliquely viewed from the lower side. The lower case 2a includes a rectangular bottom plate 20 and four side plates 21 and 22. Furthermore, a flange 23 is formed in the upper ends of the side plates 21 and 22 to be bent toward the outside of the case. As described above, each of two side plates 22 disposed to be perpendicular to a transverse direction of the case is provided with a plurality of brackets 30 to fix the battery pack 1 to the vehicle. The bracket 30 is formed in an L shape, and includes a vertical portion 30a fixed to the side plate 22 and a horizontal portion 30b fixed to the battery pack fastening part 100. The bracket 30 is fixed to the side plate 22 by welding such as a spot welding, and may be fixed using a fastening part such as a screw.

As illustrated in FIG. 3($b$), a pair of arched lower brackets 32 is provided in the bottom plate 20 of the lower case 2a to connect the bracket 30 provided in the side plate 22 and the bottom plate 20. Further, in this embodiment, a pair of lower brackets 32 is provided in accordance with the brackets 30 provided in each side plate 22. These lower brackets 32 may be integrally provided as an arched lower bracket in other words, the lower bracket may be configured by a plate portion facing the bottom plate 20, a bent portion which is connected to the plurality of brackets 30 provided in one side plate 22, and a bent portion which is connected to the plurality of brackets 30 provided in the other side plate 22. With such an integrated configuration, the strength can be increased still more. The lower bracket 32 is a bracket long and thin in the longitudinal direction of the lower case 2a. The plurality of brackets 30 provided in one side plate 22 are connected to one lower bracket 32. The bracket 30, the bottom plate 20, and the lower bracket 32 are welded by the spot welding. Of course, these components may be fixed using a fastening part such as a screw.

While not illustrated in the drawing, a plurality of through holes are formed in the bottom plate 20 of the lower case 2a to allow bolts to pass through to fix the battery module 5 to the bottom plate 20. On the other hand, a nut 300 is welded to be screwed with the bolt at a position facing each through hole of the lower bracket 32.

On the other hand, as illustrated in FIG. 2, the upper case 2b includes a rectangular top plate 24 and four side plates 25 and 26. Furthermore, a flange 27 is formed in the end portion of the side plates 25 and 26 to be bent toward the outside of the case. The upper case 2b serves as a lid with respect to the lower case 2a, and has a box-shaped configuration to improve the strength compared to a tabular lid. Furthermore, rigidity is improved still more by providing the flange 27. In addition, the flange 23 of the lower case 2a is also improved in rigidity. Further, the flange 23 of the lower case 2a may be formed to be bent toward the inside of the case. With such a configuration of the flange 23, the flanges 23 and 27 can be configured not to protrude from the side surface of the case.

In the top plate 24, a plurality of hump portions 240 deformed in an outwardly convex shape are formed by drawing processing. The top of the bump portion 240 is formed in a plane shape, and the supporting member 31 is fixed to the top by the spot welding. As will be described below, the positions of the respective bump portions 240 in the longitudinal direction of the case are substantially matched to the positions of the partitioning members 6.

(Fixing Structure of Battery Nodule 5)

FIG. 4 is a diagram illustrating a fixing structure of the battery module 5 with respect to the case 2, and a cross-sectional view illustrating the battery pack 1 vertically taken with respect to the longitudinal direction of the case. The battery module 5 includes a module case 51 which stores the plurality of battery cells 50. As illustrated n FIG. 4, a total of fourteen battery cells 50 are divided into three stages and stored in the module case 511.

Cylindrical bolt penetration portions 510 are provided at four corners of the module case 51 (see FIG. 2). The battery module 5 stored in the case 2 is fixed to the case 2 and the lower bracket 32 by a bolt 301 and the nut 300. The upper end of the bolt penetration portion 510 protrudes to the upper side from the upper surface of the module case 51, and the lower end of the bolt penetration portion 510 protrudes to the lower side from the lower surface of the module case 51. Therefore, the bolt penetration portion 510 of the module case 51 is interposed between the top plate 24 of the upper case 2b and the lower bracket 32 by being fastened by the bolt 301. Except the bolt penetration portion 510, a gap is formed between the module case 51 and the bottom plate 20 and the top plate 24. With such a fixing structure, the plurality of battery modules 5 are fixed with a predetermined interval therebetween the along longitudinal direction of the case 2 as illustrated in FIG. 2.

[Description on Structure Improved in Strength]

The lower case 2a and the upper case 2b are formed by a metal sheet such that the metal sheet is pressed in a box shape having the flanges 23 and 27 as illustrated in FIGS. 2 and 3. As illustrated in FIG. 4, the heavy battery module 5 is fixed to the top plate 24 and the bottom plate 20 by the bolt 301, and thus is insufficient in strength only by the case 2 (the lower case 2a and the upper case 2b). In particular, since vibrations and impacts are added as the vehicle runs in the case of the on-vehicle battery pack, the heavy battery module 5 is vibrated, and thus the case 2 may be deformed.

In this embodiment, since the arched lower bracket 32 is provided, the weight of the battery module 5 is transferred onto the lower bracket 32 through the bottom plate 20, and further transferred onto the bracket 30 from the lower bracket 32. Therefore, the mechanical strength of the battery pack 1 is improved. Furthermore, since the upper case 2b is formed in a box shape having the side plates 25 and 26 similarly to the lower case 2a, the bump portion 240 is provided in the top plate 24, and the flange 27 is provided in the side plates 25 and 26, so that the strength of the upper case 2b is improved.

Furthermore, in this embodiment, the partitioning member 6 is provided as a reinforcing part of the case 2 as described below, so that the strength against an own weight and an external force is extremely improved. FIG. 5 is a perspective view of the partitioning member 6. The partitioning member 6 includes a connection portion 61 which is connected to the upper case 2b, connection portions 62a and 62b which are connected to the side plate 22 of the lower case 2a, and connection portions 63a and 63b which are connected to the bottom plate 20 of the lower case 2a. The respective connection portions 61, 62a, 62b, 63a, and 63b are formed by bending the partitioning member 6 in an L shape. In the connection portion 61, a nut 610 is welded and fixed to be fastened by bolt to the upper case 2b. Similarly, the nut 610 is provided even in the connection portions 62a and 62b for the fastening by bolt.

In addition, the partitioning member 6 is formed by a metal plate, and is subject to the drawing processing to have a line shape to improve rigidity of the partitioning member 6 itself. In the following, the portion subjected to the drawing processing will be called constriction lines 601 to 609. In the partitioning member 6, the constriction lines 601 and 602 connect the connection portion 61 and the connection portions 62a and 62b, the constriction lines 603 and 604 connect the connection portion 61 and the connection portions 63a and 63b, the constriction line 605 connects the connection portion 62a and the connection portion 63a, the constriction line 606 connects the connection portion 62b and the connection portion 63b, and the other constriction lines 607, 608, and 609 are provided.

As described below, the partitioning member 6 has also a function of preventing that the gas ejected from the safety valve of the battery cell 50 is ejected toward the adjacent battery module 5. Therefore, in the partitioning member 6, not only a metal plate region linking the connection portions but also metal plate regions 6A, 6B, and 6C are also provided, so that the gas is securely prevented from being ejected by the partitioning member 6. The above constriction line 607 is provided to improve the rigidity of the metal plate region 6A. Similarly, the constriction lines 608 and 609 are provided to improve the rigidity of the metal plate regions 6B and 6C where the constriction lines are formed. In addition, a plurality of through holes 611 are provided in the partitioning member 6 to attach harness clips to unite wirings of the battery module 5. Further, a fixing portion 64 is formed in the metal plate region 6A to fix the harness.

FIG. 6 is a cross-sectional view illustrating a connection structure of the partitioning member 6 with respect to the case 2 taken along a direction perpendicular to the longitudinal direction of the case 2. The lower case 2a and the upper case 2b are integrally formed by fastening the flanges 23 and 27 by bolt. Then, the partitioning member 6 is connected to the top plate 24, the bottom plate 20, and the right and left side plates 22 of the integrated case 2. The position of the partitioning member 6 in the longitudinal direction of the case is substantially matched to the fixing position of the bracket 30.

As described above, the position of the bump portion 240 formed in the top plate 24 in the longitudinal direction of the case is substantially matched to the fixing position of the bracket 30, and an L-shaped supporting member 31 is fixed to the outer peripheral surface of the bump portion 240 by the spot welding. The connection portion 61 is fixed by bolt to an inner circumferential surface of the bump portion 240. As a result, the connection portion 61 of the partitioning member 6, the top plate 24, and the supporting member 31 are collectively fastened by bolt. In the bolt fixing, there is used the nut 610 which is provided in the connection portion 61.

Similarly, the connection portion 62*b* on the right side of the drawing is fixed by bolt to the side plate 22 of the lower case 2*a*. Since the position of the partitioning member 6 in the longitudinal direction of the case is substantially matched to the position of the bracket 30, the connection portion 62*b*, the side plate 22, and the bracket 30 are collectively fixed by bolt. In the bolt fixing, there is used the nut 610 which is provided in the connection portion 62*b*. Since the connection portion 62*a* on the left side of the drawing is also configured similarly to the connection portion 62*b*, the connection portion 62*a*, the side plate 22, and the bracket 30 are collectively fixed by bolt.

On the other hand, the connection portions 63*a* and 63*b*, the bottom plate 20, and the lower bracket 32 are connected to each other using a bolt 320 and a nut (not illustrated). The head of the bolt 320 is welded to the lower bracket 32, and the nut is fastened to the shaft which passes through the connection portions 63*a* and 63*b*, the bottom plate 20, and the lower bracket 32 and protrudes into the case. Further, the connection portions 63*a* and 63*b* may be collectively welded to the bottom plate 20 and the lower bracket 32 by the spot welding in place of the fastening with a bolt.

FIG. 7 is a diagram taken along the longitudinal direction of the case 2. Among five supporting members 31, the supporting member 31 in the left end of the drawing is fixed to the bump portion 240 (see FIG. 1) which is formed in the peripheral portion (a region where the strength becomes high by the bending) of the top plate having a relatively high strength in the upper case 2*b*. In this case, the partitioning member 6 is not provided in the bump portion 240. The remaining four supporting members 31 are fixed to the bump portion 240 (see FIG. 1) of the top plate 24 as described above, and also connected to the connection portion 61 of the partitioning member 6.

In this way, the supporting member 31 and the partitioning member 6 are disposed in parallel with the vertical direction of the case 2. Therefore, a force applied to the supporting member 31 in the vertical direction is transferred through the partitioning member 6 to the lower bracket 32 provided on the rear surface side of the bottom plate 20 of the lower case 2*a*, and further transferred from the lower bracket 32 to the bracket 30.

The battery module 5 is disposed between these partitioning members 6, and the bolt penetration portion 510 is fixed by bolt to the top plate 24 and the bottom plate 20 in the vicinity of the partitioning member 6. The weight of each battery module 5 is transferred to the lower bracket 32 and the bracket 30 through the adjacent partitioning members 6. In other words, the total weight of the battery module 5 is dispersed and transferred to the bracket 30. On the contrary, a force from the bracket 30 due to vibrations and impacts of the vehicle dispersedly operates on the entire case 2 through the partitioning member 6 and the lower bracket 32.

(Effect of Partitioning Member 6)

FIG. 8 is a diagram for describing a function of the partitioning member as a reinforcing part. The constriction lines 601 to 609 formed in the partitioning member 6 illustrated in FIG. 5 are portions having a high strength in the partitioning member 6. Then, the constriction lines 601, 602, 604, 605, and 606 linking the connection portions are formed almost in a truss structure. Symbols A1 to A4 indicate linking portions between the partitioning member 6 and the case 2.

The linking portion indicated by Symbol A1 is a linking portion between the bracket 30 and the lower bracket 32. The linking portion indicated by Symbol A2 is a linking portion between the lower bracket 32 and the connection portion 63*a* or 63*b* of the partitioning member 6. The linking portion indicated by Symbol A3 is a linking portion between the connection portion 61 of the partitioning member 6, and the bump portion 240 and the supporting member 31. In addition, the linking portion indicated by Symbol A4 includes the flanges 23 and 27 which are fastened by bolt to the linking portion between the bracket 30 and the connection portion 62*a* or 62*b* of the partitioning member 6. Further, since the portions of the flanges 23 and 27 have a high rigidity in the case 2, the positions of the connection portions 62*a* and 62*b* are desirably provided in the vicinity of the flanges 23 and 27.

The linking portions A1 to A4 are structured to improve the strength of the case 2. In the linking portion A3, the bump portion 240 is provided to improve the strength of the upper case 2*b* In addition, the lower case 2*a* and the upper case 2*b* of the case 2 each are formed in a box shape having the side plates. The entire rigidity of the case 2 is improved by fastening the flanges 23 and 27 formed in each side plate by bolt (the linking portion A4). The bracket 30 is a component to fix the case 2 to the battery pack fastening part 100 (see FIG. 1) of the vehicle as described above, and thick metal plates are used to obtain a sufficient supporting strength. When being fixed to the lower case 2*a*, the bracket 30 is desirably connected to the flanges 23 and 27 having a high rigidity or in the vicinity thereof (the linking portion A4). In addition, also the arched lower bracket 32 provided between the bracket 30 and the bottom plate 20 of the lower case 2*a* is provided as a member for increasing the strength of the case 2 (the linking portions A1 and A2).

In FIG. 8, the broken line schematically indicates a strength transfer path of the partitioning member 6 itself. When an external force is added to the partitioning member 6, the force is transferred into the partitioning member 6 as an internal force, and the external force is transferred to the other linking portions. The transfer path of the internal force is the strength transfer path. Since the internal force is transferred along the portions having a high rigidity, the force can be considered to be transferred along the respective constriction lines 601 to 606 in the partitioning member 6, and substantially forms the strength transfer path as illustrated by the broken line. The two-dot chain line is obtained by combining the strength transfer path (broken line) in a case where the external force is added to the linking portion A3. In addition, the solid line shows the strength transfer path of the bracket 30 and the lower bracket 32.

As described above, the supporting member 31 fixed to the bump portion 240 which is a portion where the strength of the top plate 24 is increased. In the bump portion 240, the partitioning member 6 is connected, and the supporting member 31 is connected to the connection portion 61 of the partitioning member 6 in the linking portion A3. Therefore, in a case where the external force is added to the supporting member 31, the force is transferred to the linking portion A4 of the linking portion A2 of the bottom plate and the linking portion A4 of the side plate through the constriction line of almost the truss structure. Furthermore, the transferred force is forwarded to the vehicle (the battery pack fastening part 100) through the bracket 30 and the lower bracket 32 which are made as a strength component. Then, since such the partitioning members 6 are alternately disposed with respect to the battery modules 5 in the longitudinal direction of the case, the external force is dispersed to the plurality of partitioning members 6 and transferred to the bracket 30. As a result, the strength of the case 2 against the external force can be improved, and it is possible to prevent the external force from affecting on the portion where the battery cell 50 of the battery module 5 is stored.

In this way, the partitioning member 6 is connected to the components (the bracket 30 and the lower case 2a) having a high strength in the linking portions A2, A3, and A4. Therefore, even in a case where the external force is applied to the case 2 through the supporting member 31 and the bracket 30, it is possible to suppress the deformation of the case 2 formed of a thin metal plate.

In addition, since the lower bracket 32 is linked to the bracket 30 in the linking portion A1, the weight of the battery module 5 is transferred to the bracket 30 through the partitioning member 6 and the linking portion A4, and transferred to the bracket 30 through the bottom plate 20, the lower bracket 32, and the linking portion A1. Since such a weight is dispersed and transferred to the bracket 30, a load onto the bottom plate 20, the lower bracket 32, and the side plate 22 is alleviated. Furthermore, since the force is dispersed in the longitudinal direction by the partitioning member 6 and the lower bracket 32, the strength related to the longitudinal direction of the case is also improved.

(Gas Blocking Effect of Partitioning Member 6)

FIG. 9 is a diagram for describing a gas blocking effect of the partitioning member 6. As described above, the partitioning member 6 has a function of preventing that the gas ejected from the safety valve of the battery cell 50 from being ejected toward the adjacent battery modules 5. The safety valve of the battery cell 50 is provided in a surface which is exposed from the module case 51. Therefore, the gas is ejected toward the adjacent battery modules 5 as depicted by arrow G. However, the partitioning member 6 is provided with not only the portions of the constriction lines 601 to 606 serving as the strength transfer path but also the metal plate regions 6A, 6B, and 6C therebetween. Therefore, it is possible to prevent the ejected gas from blowing to the adjacent battery modules 5.

(Harness Attaching Function of Partitioning Member 6)

FIG. 10 illustrates an example of harness (power lines and sensing lines) wounded in the case 2. In FIG. 10, harnesses H1, H2, and H3 are harnesses of different systems. These harnesses are disposed to be separated from each other in order to avoid crosstalk such as noises. In this embodiment, the partitioning members 6 are provided along the longitudinal direction of the case, and the through holes 611 and the fixing portion 64 are formed in each partitioning member 6 as illustrated in FIG. 5 to fix the harnesses H1, H2, and H3.

In the example illustrated in FIG. 10, the harness clip is fixed to the through hole 611 (see FIG. 5) provided in the connection portion 62a of the partitioning member 6, and thus the harness H1 is fixed to the connection portion 62a. In addition, the harness H2 is fixed to the fixing portion 64 by the harness clip. While not illustrated in FIG. 10, the harness H3 is fixed to the connection portion 62b (see FIG. 5) provided on a side opposite to the connection portion 62a.

Also in the portions indicated by Symbols J1 and J2, the harnesses are fixed to the partitioning member 6. In this way, it is possible to fix the harnesses H1 to H3 to be appropriately disposed using the partitioning member 6. Therefore, even when the vibrations of the vehicle are added to the battery pack 1, it is possible to prevent the positions of the harnesses H1 to H3 from being deviated. Further, since the case 2 in this embodiment is divided into the over case 2a and the upper case 2b at the center position in the vertical direction, the workability for wiring the harnesses is improved.

(First Modification)

FIG. 11 is a diagram illustrating a first modification of the battery pack 1 described above. In the battery pack 1 illustrated in FIG. 1, the bracket 30 is disposed in correspondence with each partitioning member 6. Therefore, the number of brackets 30 is necessarily at least two or more times the number of partitioning members 6. On the other hand, the brackets 30A and 30B are provided in each of the side plates 22 in the battery pack 1 of the first modification as illustrated in FIG. 11. The other configurations are similar to those of the battery pack 1 illustrated in FIG. 1.

While not illustrated in FIG. 11, the partitioning members 6 are provided with respect to four bump portions 240 up to the fourth position toward the back side from the front side in the longitudinal direction of the case. The bracket 30A is fastened by bolt to the connection portion 62b (see FIG. 6) of two partitioning members 6 disposed in the front side in the portion of the side plate 22. Symbol 302 indicates a bolt for fastening the partitioning member 6. On the other hand, the bracket 30B is fastened by bolt to the connection portion 62 of two partitioning members 6 disposed on the back side. With such a configuration, the number of brackets 30 can be reduced. In addition, in a case where there is only two fastening places on the side due to the structure of the battery pack fastening part 100 of the vehicle, the brackets 30A and 30B are used as illustrated in FIG. 11.

(Second Modification)

FIGS. 12 to 14 are diagrams illustrating a second modification of the battery pack 1. FIG. 12 is a perspective view illustrating an outer appearance of the battery pack 1. FIG. 13 is a cross-sectional view illustrating the battery pack 1 taken in a direction perpendicular to the longitudinal direction of the case. The battery pack 1 of FIG. 13 has the same structure as that of the battery pack 1 illustrated in FIG. 1 except a bracket 30C which is different from the bracket 30.

The fastening structure between the battery pack 1 and the battery pack fastening part 100 in the second modification is the structure as illustrated in FIG. 13. The portion of the flanges 23 and 27 of the case 2 is fastened to the battery pack fastening part 100. Therefore, the bracket 30C in the second modification can be considered to be formed by integrating the bracket 30 and the lower bracket 32, and includes a connection region 303 which is connected to the bottom plate 20 of the case 2, a connection region 304 which is connected to the side plate 22 of the case 2, and a connection region 305 which is fastened by bolt to the battery pack fastening part 100 (see also FIG. 12).

FIG. 14(a) is a diagram illustrating the bracket 30C viewed in a direction of arrow D of FIG. 12, and FIG. 14(b) is a cross-sectional view taken along a line E-E of FIG. 14(a). The portion indicated by Symbol F is a convex portion protruding outward by the drawing processing, and the convex portion F is formed along the connection regions 303 to 305. In other words, the rigidity of the bracket 30C is increased by forming a plurality of such convex portions F. The connection portions 63a and 63b of the partitioning member 6 (see FIG. 5) are linked to a portion having no convex portion F of the connection region 303. In addition, the flanges 23 and 27 of the case 2 are fastened by bolt to the portion having no convex portion F of the connection region 305.

A through hole 306 is formed in the convex portion F of the connection region, and a bolt 307 of FIG. 13 is fastened to the battery pack fastening part 100 to pass through the through hole 306. A through hole 308 formed in the portion having no convex portion F illustrated in FIG. 14(*a*) is a through hole to connect the connection portions 62*a* and 62*b* of the partitioning member 6 to the side plate 22 and the bracket 30C by a bolt 321 of FIG. 12. The nut 300 is fixed in the vicinity of the convex portion F of the connection region 303. The nut is similar to the nut 300 illustrated in FIG. 4 and is used when the battery module 5 is fixed by bolt.

Further, in the above embodiment, the lower case 2*a* and the upper case 2*b* both are formed in a box shape having the side plates. However, the shape of the case 2 is not limited to the above shape, and may be configured such that a tabular lid 28 is provided in the box-shaped lower case 2*a* as illustrated in FIG. 19. In this case, the connection portion between the bracket 30 and the lower case 2*a* extends up to the vicinity of a flange fastening part K of the lower case 2*a* and the lid 28 (or such that the upper end of the bracket 30 abuts on the flange of the lower case 2*a*. Therefore, such a configuration is desirable to the strength.

Second Embodiment

FIG. 15 is a diagram illustrating a second embodiment of the battery pack according to the invention. In the above first embodiment, the partitioning member 6 is alternately disposed with respect to the battery module 5 in order to improve the strength of the case 2. In the second embodiment described below, a reinforcing part 16 is provided in the upper case 2*b* by the drawing processing as illustrated in FIG. 15 in place of the partitioning member 6. The reinforcing part 16 is provided at the same position as that of the bump portion 240 in the battery pack 1 illustrated in FIG. 1, and is arranged near the fixing position of the battery module 5.

In addition, the supporting member 31 is fixed in the upper surface of each reinforcing part 16. A method of fixing the supporting member 31 to the reinforcing part 16 is similar to the method of the supporting member 31 of FIG. 1 to the bump portion 240.

FIG. 16 is a perspective view illustrating an inner circumferential surface of the upper case 2*b*. The reinforcing part 16 is formed along the top plate 24 and both side plates 26, and the both ends of the reinforcing part 16 reach the flange 27. In this way, the reinforcing part 16 is connected to the flange 27 which is the other reinforcing place. In other words, in a case where an external force is operated on the supporting member 31 provided in the upper portion of the reinforcing part 16, the external force reaches the flange 27 through the reinforcing part 16. The upper end of the bracket 30 provided in the lower case 2*a* reaches the flange 23 of the lower case 2*a* or the vicinity thereof. Therefore, the force transferred from the reinforcing part to the flange 27 is transferred to the bracket 30 through the flange 23. In this way, similarly to the case of the partitioning member 6 of the first embodiment, the external force added to the supporting member 31 is transferred to the bracket 30 through the reinforcing part 16 and the flanges 23 and 27 which are high strengthened regions. As a result, it is possible to improve the strength of the case 2. In addition, since there is no portion interposed between the battery modules 5 unlike the partitioning member 6, the battery module 5 is easily assembled to the lower case 2*a*.

Further, in the example illustrated in FIGS. 15 and 16, the convex reinforcing part 16 is formed on the outside of the case. However, the reinforcing part may be formed on the inside of the case, and the same operational effect can be achieved.

In addition, the reinforcing part 16 is formed in not only the upper case 2*b* but also the lower case 2*a* as illustrated in FIG. 20, so that it is possible to improve the strength of the case 2 still more. In this case, the reinforcing part 16 of the upper case 2*b* and the reinforcing part 16 of the lower case 2*a* are desirably matched to each other in line in the vertical direction. With such a configuration, the force transferred from the portion of the reinforcing part 16 of the upper case 2*b* is easily transferred to the reinforcing part 16 of the lower case 2*a*, and further transferred from the reinforcing part 16 of the lower case 2*a* to the bracket 30.

Of course, the reinforcing part 16 of the upper case 2*b* is connected to the flange 27, and the reinforcing part 16 of the lower case 2*a* is connected to the flange 23. Therefore, even when the position of the reinforcing part 16 of the upper case 2*b* is deviated from the position of the reinforcing part 16 of the lower case 2*a*, the force is transferred from the reinforcing part 16 on the upper side to the reinforcing part 16 on the lower side through the flanges 23 and 27.

(First Modification)

FIG. 17 is a diagram illustrating a first modification of the second embodiment. In the second embodiment illustrated in FIGS. 15 and 16, the reinforcing part 16 of a groove shape is formed in the upper case 2*b* by the drawing processing. On the other hand, in the first modification illustrated in FIG. 17, a reinforcing part 16B of a beam shape subjected to the drawing processing is formed as a separate member, and the reinforcing part 16B is fixed to the inner circumferential surface of the upper case 2*b* by the spot welding. The respective reinforcing parts 16B are disposed between the battery module 5 and the battery module 5 similarly to the case of the reinforcing part 16.

The portion indicated by Symbol 160 is the convex portion formed by the drawing processing. Similarly to the case of the reinforcing part 16, the convex portion 160 is formed along the top plate 24 and the both side plates 26, and both ends of the reinforcing part 16B reach the flange 27. Unlike the case of FIG. 15, the outer peripheral surface of the top plate 24 of the portion where the reinforcing part 16B is fixed is formed in a plane shape, and the supporting member 31 is connected to the portion where the reinforcing part 16B is fixed. Even in the first modification, the reinforcing part 16B achieves the same operational effect as that of the reinforcing part 16 described above. In addition, the reinforcing part 16B may be provided in both of the upper case 2*b* and the lower case 2*a*.

(Second Modification)

FIG. 18 is a diagram illustrating a second modification of the second embodiment. In the first modification, the reinforcing part 16B of a beam shape where the convex portion 160 is formed as illustrated in FIG. 17 is provided in the inner circumferential surface of the upper case 2*b*. On the other hand, in the second modification illustrated in FIG. 18, a reinforcing part 16C of a beam shape has an L-shaped cross section, and reaches from the flange 27 of the side plate 26 on one side to the flange 27 of the side plate 26 on the other side. Therefore, the reinforcing part 16C of the second modification also effectively reinforces the case 2 similarly to the reinforcing part 16B. In addition, the reinforcing part 16C may be provided in both of the upper case 2b and the lower case 2a.

As described above, the battery pack 1 of this embodiment includes, for example, the case 2 which has the bottom plate 20 where at least one battery module is placed, the sides plates 21 and 22 which are erected around the bottom plate 20, and the top plate 24 (or the lid 28) which is provided in the upper ends of the side plates 21 and 22 to face the bottom plate 20, the bracket 30 which is provided in the side plate 22 and fixes the case 2 to the battery pack fastening part 100 as the fixing portion of the vehicle, and the partitioning member 6 and the reinforcing part 16 which transfer the force added to the case 2 to the bracket 30 as illustrated in FIGS. 1, 15, and 19 (see also FIGS. 2, 3, 7, 8, 11, 12, and 16).

With the reinforcing part 16 and the partitioning member 6, the force (the weight of the case 2 and a force caused by a load from the outside) added to the case 2 is transferred toward the bracket 30 through the reinforcing part 16 and the partitioning member 6, and further transferred from the bracket 30 to the battery pack fastening part 100. In other words, the bracket 30 supporting the case 2 is connected to the portions (the reinforcing part 16 and the partitioning member 6) having a high strength of the case 2. As a result, the strength of the case 2 can be improved.

Even in a case where a beam member such as the reinforcing part 16B illustrated in FIG. 17 and the reinforcing part 16C illustrated in FIG. 18 are provided in the case 2 in place of the reinforcing part 16 and the partitioning member 6, the same operational effect as that of the reinforcing part 16 is achieved.

Furthermore, in the configuration that the plurality of battery modules 5 are disposed along the longitudinal direction of the case 2, the partitioning member 6 is alternately disposed with respect to the battery module 5 along the longitudinal direction of the case 2, and includes the connection portion 61 to be connected to the top plate 21 and the connection portions 62a and 62b to be connected to the bracket 30 through the side plate 22 as illustrated in FIGS. 5 and 6. With such a configuration, in a case where an external force is operated on the top plate 24 for example, the force is transferred into the partitioning member 6, and transferred from the connection portions 62a and 62b to the bracket 30 through the side plate 22. Therefore, it is possible to suppress an influence of the external force onto the case 2 formed of a thin metal plate.

In addition, as illustrated in FIGS. 1 to 3, it is desirable that the case 2 be configured by the lower case 2a and the upper case 2b, the lower case 2a be provided with the bottom plate 20, the side plates 21 and 22 erected around the bottom plate 20, and the flange 23 formed at the edges of the side plates 21 and 22, and the upper case 2b be provided with the top plate 24, the side plates 25 and 26 erected around the top plate 24, and the flange 27 which is formed at the edges of the side plates 25 and 26 and fastened with the flange 23. It is possible to improve the rigidity of the case 2 itself by dividing the case 2 into two parts and by forming the flanges 23 and 27 in these fastening parts.

Furthermore, the case 2 is provided with the lower bracket 32 as a supporting member to be bridged in an arch shape between the vertical portion 30a of the L-shaped bracket 30 and the bottom plate 20. The battery module 50 is connected to the lower bracket 32 through the bottom plate 20. Similarly, the connection portions 63a and 63b of the partitioning member 6 are connected to the lower bracket 32 through the bottom plate 20. Since the battery module 5 is connected to the lower bracket 32 through the bottom plate 20, the weight of the battery module 5 is transferred toward the bracket 30 through the lower bracket 32. In addition, the force transferred through the partitioning member 6 is transferred toward the bracket. 30 through the lower bracket 32. As a result, the strength of the bottom plate 20 is improved.

Furthermore, the top plate 24 is, for example, provided with the plurality of bump portions 240 as a deformation portion formed to bulge by the drawing processing as illustrated in FIG. 1. Therefore, the strength of the top plate 24 itself can be improved. Then, it is possible to suppress the top plate 24 from being deformed by an external force by connecting the connection portion 61 of the partitioning member 6 to the deformation portion. The deformation portion is formed to bulge outside the case in the case of the bump portion 240 of FIG. 1, and may be formed to bulge inside the case.

Since the supporting member 31 protruding from the top plate 24 to the upper side is provided in the outer peripheral surface of the deformation portion (the bump portion 240), it is possible to prevent the external force from being added to the top plate portion where the partitioning member 6 is not connected. In addition, the force added to the indication member 31 is transferred to the bracket 30 through the bump portion 240, the partitioning member 6, and the lower bracket 32.

The through hole 611 and the fixing portion 64 may be provided in each partitioning member 6 to fix the wirings (the harnesses H1 to H3 of FIG. 10) leading out of the battery module 5 as illustrated in FIGS. 5 and 10. With the use of these components, it is possible to separately fix the harnesses H1 to H3 as illustrated in FIG. 10. In addition, the metal plate regions 6A, 6B, and 6C may be provided as sealing portions in each partitioning member 6 to inhibit the gas discharged from the safety valve of the battery cell 50 from flowing to the adjacent battery modules 5.

The above embodiments may be implemented independently, or may be implemented in combination. The effects of the respective embodiments may be achieved in a dependent manner or in a synergistic manner. In addition, the invention is not limited to any or these embodiments as long as the features of the invention are not degraded.

REFERENCE SIGNS LIST

1 . . . battery pack, 2 . . . case, 2a . . . lower case, 2b . . . upper case, 5 . . . battery module, 6 . . . partitioning member, 61, 6B, 6C . . . metal plate region, 16, 16B, 16C . . . reinforcing part, 20 . . . bottom plate, 21, 22, 25, 26 . . . side plate, 23 and 27 . . . flange, 24 . . . top plate, 28 . . . lid, 30, 30A to 30C . . . bracket, 31 . . . supporting member, 32 . . . lower bracket, 50 . . . battery cell, 61, 62a, 62b, 63a, 63b . . . connection portion, 64 . . . fixing portion, 100 . . . battery pack fastening part, 611 . . . through hole, 240 . . . bump portion, 601 to 609 . . . constriction line, A1 to A4 linking portion, H1 to H3 . . . harness

The invention claimed is:
1. An on-vehicle battery pack, comprising:
at least one battery module that includes a plurality of battery cells;
a case that includes a bottom plate where the battery module is placed, a side plate erected around the bottom plate, and a top plate provided to face the bottom plate at an upper end of the erected side plate;
a bracket that is provided in the side plate and is used to fix the case to a vehicle loading portion; and a reinforcing part that is provided in the case and transfers a force added to the case to the bracket;

wherein a plurality of the battery modules are disposed along a longitudinal direction of the case, wherein the reinforcing part is a partitioning member that is alternately disposed with respect to the battery module along the longitudinal direction, and includes a first connection portion to be connected to the top plate, and a second connection portion to be connected to the bracket through the side plate, wherein the top plate includes a plurality of deformation portions that are deformed to bulge outside the case or inside the case, wherein the first connection portion of the partitioning member is connected to the deformation portion, and wherein an L-shaped support member protruding upward from the top plate beyond all other portions of the on-vehicle battery pack is provided in an outer peripheral surface of the deformation portion.

2. The on-vehicle battery pack according to claim 1, wherein the side plate includes a first side plate and a second side plate which are separated, wherein the case includes a lower case that includes the bottom plate, the first side plate erected around the bottom plate, and a first flange formed at an upper end of the erected first side plate, and an upper case that includes the top plate, the second side plate erected around the top plate, and a second flange that is formed at an upper end of the erected second side plate to be fastened to the first flange, and wherein the second connection portion is disposed in the vicinity of the first flange of the first side plate.

3. The on-vehicle battery pack according to claim 2, wherein the bracket is an L-shaped bracket that includes a first fixing portion to be fixed to the first side plate and a second fixing portion to be fixed to the vehicle loading portion, the on-vehicle battery pack, further comprising:

a supporting member that is bridged in an arched shape between the bracket and the bottom plate and connected to the bracket and the bottom plate, wherein the battery module is connected to the supporting member through the bottom plate in a connection portion between the supporting member and the bottom plate, and wherein the partitioning member includes a third connection portion that is connected to the supporting member through the bottom plate in the connection portion between the supporting member and the bottom plate.

4. The on-vehicle battery pack according to claim 1, wherein a plurality of wiring fixing portions are separately provided to fix a wiring leading out of the battery module to each partitioning member.

5. The on-vehicle battery pack according to claim 1, wherein each partitioning member includes a sealing portion to inhibit a gas discharged from a safety valve of the battery cell of the battery module from flowing into the adjacent battery modules.

* * * * *